(12) United States Patent
Matsuki et al.

(10) Patent No.: US 7,687,566 B2
(45) Date of Patent: Mar. 30, 2010

(54) PROPYLENE RESIN COMPOSITION AND MOLDING THEREOF

(75) Inventors: Akihiro Matsuki, Yokkaichi (JP);
Shinichi Kanamaru, Sakaide (JP);
Yutaka Fukuyama, Minato-ku (JP);
Nobutake Mise, Minato-ku (JP);
Eihachi Takamura, Yokkaichi (JP);
Koichi Nakayama, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 360 days.

(21) Appl. No.: 10/592,797

(22) PCT Filed: Feb. 4, 2005

(86) PCT No.: PCT/JP2005/001690
§ 371 (c)(1),
(2), (4) Date: Jun. 25, 2007

(87) PCT Pub. No.: WO2005/087863
PCT Pub. Date: Sep. 22, 2005

(65) Prior Publication Data
US 2007/0238828 A1     Oct. 11, 2007

(30) Foreign Application Priority Data
Mar. 15, 2004   (JP)   .................... 2004-073100

(51) Int. Cl.
*B60C 1/00*    (2006.01)
*C08K 3/04*    (2006.01)
*C01D 3/00*    (2006.01)
*C01B 31/02*   (2006.01)
*C09C 1/48*    (2006.01)

(52) U.S. Cl. .................. 524/496; 423/449.1; 423/450

(58) Field of Classification Search ............... 524/496, 524/584; 423/449.1, 450
See application file for complete search history.

(56) References Cited

U.S. PATENT DOCUMENTS 5,587,417 A * 12/1996 Nakane et al. ............ 524/495
5,616,627 A *  4/1997 Sakurai et al. ........... 521/134
6,277,350 B1 *  8/2001 Gerspacher ............ 423/449.1
6,642,312 B2 * 11/2003 Park et al. ............... 525/191

FOREIGN PATENT DOCUMENTS

EP      0 572 178 A1    12/1993

(Continued)

*Primary Examiner*—Mark Eashoo
*Assistant Examiner*—Angela C Scott
(74) *Attorney, Agent, or Firm*—Oblon, Spivak, McClelland, Maier & Neustadt, L.L.P.

(57) ABSTRACT

To provide a propylene resin composition excellent in both the electroconductivity and moldability and excellent in their balance, and a molded product thereof.

A propylene resin composition comprising from 50 to 98 wt % of a propylene resin having a MFR of from 5 to 300 g/10 min, and from 2 to 50 wt % of carbon black having a 24M4DBP absorption of at least 130 cm$^3$/100 g, a dehydrogenation amount of at most 1.2 mg/g at 1,500° C. for 30 minutes and a crystallite size (Lc) of from 10 to 17 Å. A propylene resin molded product which is a propylene resin molded product obtained by molding such a propylene resin composition and which has a volume resistivity of from $10^2$ to $10^9$ Ω·cm and a MFR of from 1 to 80 g/10 min.

16 Claims, 2 Drawing Sheets

FOREIGN PATENT DOCUMENTS

| | | |
|---|---|---|
| EP | 0 652 602 A2 | 5/1995 |
| EP | 1 666 543 A1 | 6/2006 |
| JP | 6 136289 | 5/1994 |
| JP | 9 48932 | 2/1997 |
| JP | 11 503486 | 3/1999 |
| JP | 2001 240767 | 9/2001 |
| JP | 2003 201417 | 7/2003 |
| JP | 2003 231824 | 8/2003 |
| WO | WO 87/03413 | 6/1987 |

* cited by examiner

PROPYLENE RESIN COMPOSITION AND MOLDING THEREOF

TECHNICAL FIELD

The present invention relates to a propylene resin composition excellent in both the electrical conductivity and moldability, and a propylene resin molded product obtained by molding such a propylene resin composition.

BACKGROUND ART

Polypropylene resins are widely used mainly as injection molding materials in the fields of industrial components and containers represented by e.g. components of electric home appliances, automobile components, components for household equipments and food containers, and the quantity of their use has been steadily increasing due to a remarkable progress in the catalyst/polymerization techniques and combined techniques in recent years.

In a case where a polypropylene resin is used for the purpose of electromagnetic wave-shielding, electrostatic coating or prevention of static charge among such applications, it is necessary to impart electrical conductivity, since the resin itself is naturally electrically insulating. In such a case, it is known to provide electrical conductivity by e.g. incorporating an electroconductive material represented by e.g. carbon black or by coating the surface of a molded product with a paste-form conductive material. Among such methods, coating with a conductive material requires a solvent to make a paste, and a coating step is required, such being not efficient. Therefore, a method of making a resin composition itself to be electroconductive by kneading a conductive material such as carbon black into a polypropylene resin, is adopted as a more efficient method.

The conductive material to be incorporated to the polypropylene resin includes, in addition to carbon back, one in a particle form such as graphite, titanium oxide or metal powder, and one in a fiber form such as carbon fibers, metal fibers, or conductive whiskers. However, every one of such conductive materials has a specific gravity larger than the polypropylene and tends to increase the specific gravity of the composition by its incorporation. Accordingly, with a view to minimizing the weight, it is desired to provide desired electrical conductivity by minimizing the amount of the conductive material to be incorporated. Further, one in a fiber form is not preferred, since the appearance of the composition tends to deteriorate by its incorporation, or the fibers are likely to break during repeated use (recycling), whereby the electrical conductivity is likely to be impaired.

For such reasons, it is presently most preferred to employ carbon black as a conductive material. However, by the incorporation of conductive carbon black, the flowability of the polypropylene resin composition is lowered substantially. Accordingly, especially in its application to injection molding, improvement of the moldability is desired. Further, it is generally known that among conductive carbon black, Ketjen black having activation treatment applied thereto, is most superior in the electrical conductivity. However, Ketjen black is poor in dispersibility into a polypropylene resin, and although the electrical conductivity will be improved, there has been a problem that the tensile elongation tends to be inferior due to the poor dispersibility.

Therefore, it has been desired to develop a carbon black-incorporated electroconductive polypropylene resin composition excellent in the balance of specific gravity, electroconductivity, flowability and tensile elongation.

DISCLOSURE OF THE INVENTION

Object to be Solved by the Invention

An object of the present invention is to solve the drawbacks of the prior art and to provide a carbon black-incorporated electroconductive propylene resin composition excellent in both electroconductivity and moldability and excellent in their balance, and a molded product thereof.

Means To Accomplish The Object

In view of the above problems, the present inventors have conducted an extensive study on a propylene resin composition excellent in electroconductivity and moldability and their balance and as a result, have found it possible to obtain a propylene resin composition excellent in electroconductivity and moldability and excellent also in their balance, by incorporating electroconductive carbon black having specific physical properties to a polypropylene resin having a specific flowability, and have accomplished the present invention.

Thus, the present invention provides the following:

1. A propylene resin composition comprising from 50 to 98 wt % of a propylene resin having a MFR of from 5 to 300 g/10 min, and from 2 to 50 wt % of carbon black having a 24M4DBP absorption of at least 130 cm$^3$/100 g, a dehydrogenation amount of at most 1.2 mg/g at 1,500° C. for 30 minutes and a crystallite size (Lc) of from 10 to 17 Å.
2. A propylene resin composition according to the above 1 which further contains the following ethylene elastomer, wherein the blend ratio of the propylene resin:the carbon black:the ethylene elastomer is 10 to 80:2 to 50:10 to 50, ethylene elastomer: a copolymer of ethylene with at least one other α-olefin, and it has an ethylene content in the copolymer of at least 50 wt %, a MFR of at least 1.0 g/10 min and a density of at most 0.890 g/cc.
3. The propylene resin composition according to the above 1 or 2, wherein the propylene resin is a propylene copolymer containing from 0.1 to 50 wt % of an olefin comonomer other than propylene.
4. The propylene resin composition according to any one of the above 1 to 3, wherein the propylene resin is a propylene block copolymer which contains propylene homopolymer blocks and copolymer blocks formed by copolymerization of ethylene with other α-olefin and which has a MFR of from 5 to 300 g/10 min, wherein the above propylene homopolymer blocks have a MFR of from 20 to 300 g/10 min, and the above copolymer blocks have an ethylene content of from 15 to 60 wt % and a MFR of from 0.001 to 6 g/10 min.
5. The propylene resin composition according to any one of the above 1 to 4, wherein the carbon black has a nitrogen absorption specific surface area of from 150 to 300 m$^2$/g.
6. The propylene resin composition according to any one of the above 1 to 5, wherein the ratio ($D_{mod}$/24M4DBP) of the stokes mode diameter ($D_{mod}$) to the 24M4DBP absorption of carbon black is from 0.6 to 0.9.
7. The propylene resin composition according to any one of the above 1 to 6, wherein the carbon black has a 24M4DBP absorption of from 130 to 160 cm$^3$/100 g and a nitrogen adsorption specific surface area of from 150 to 300 m$^2$/g.
8. The propylene resin composition according to any one of the above 1 to 7, wherein the carbon black has an average particle size of from 14 to 24 nm by a transmission electron microscope.
9. The propylene resin composition according to any one of the above 1 to 8, wherein the carbon black has a CTAB (cetyltrimethylammonium bromide) adsorption specific surface area of from 120 to 220 m²/g.
10. The propylene resin composition according to any one of the above 1 to 10, wherein the carbon black has a DBP absorption of from 150 to 400 cm³/100 g.
11. The propylene resin composition according to any one of the above 1 to 10, wherein the carbon black has an oxygen-containing functional group density of at most 3 μmol/m² as defined by the following formula:

Oxygen-containing functional group density (μmol/m²)=

[CO emission (μmol/g)+$CO_2$ emission (μmol/g)]

/nitrogen adsorption specific surface area (m²/g)

12. The propylene resin composition according to any one of the above 1 to 11, wherein the carbon black is oil furnace carbon black.
13. A molded product which is a propylene resin molded product obtained by molding the propylene resin composition as defined in any one of the above 1 to 12 and which has a volume resistivity of from $10^2$ to $10^9$ Ω·cm and a MFR of from 1 to 80 g/10 min.
14. A molded product which is a molded product obtained by molding the propylene resin composition as defined in any one of the above 1 to 12 and which has a volume resistivity of from $10^2$ to $10^9$ Ω·cm and a MFR of from 0.01 to 20 g/10 min.
15. A molded product which is a molded product obtained by molding the propylene resin composition as defined in any one of the above 1 to 12 and which is shaped by a molding method selected from the group consisting of injection molding, compression molding, injection-compression molding and extrusion molding.

Effects of the Invention

According to the present invention, an electroconductive propylene resin-molded product of high quality can be presented with good moldability and productivity by a propylene resin composition which is excellent in the balance of electroconductivity, flowability, specific gravity and tensile elongation and which has high levels of moldability, light weight and tensile elongation, while maintaining sufficient electroconductivity.

Figure 1:
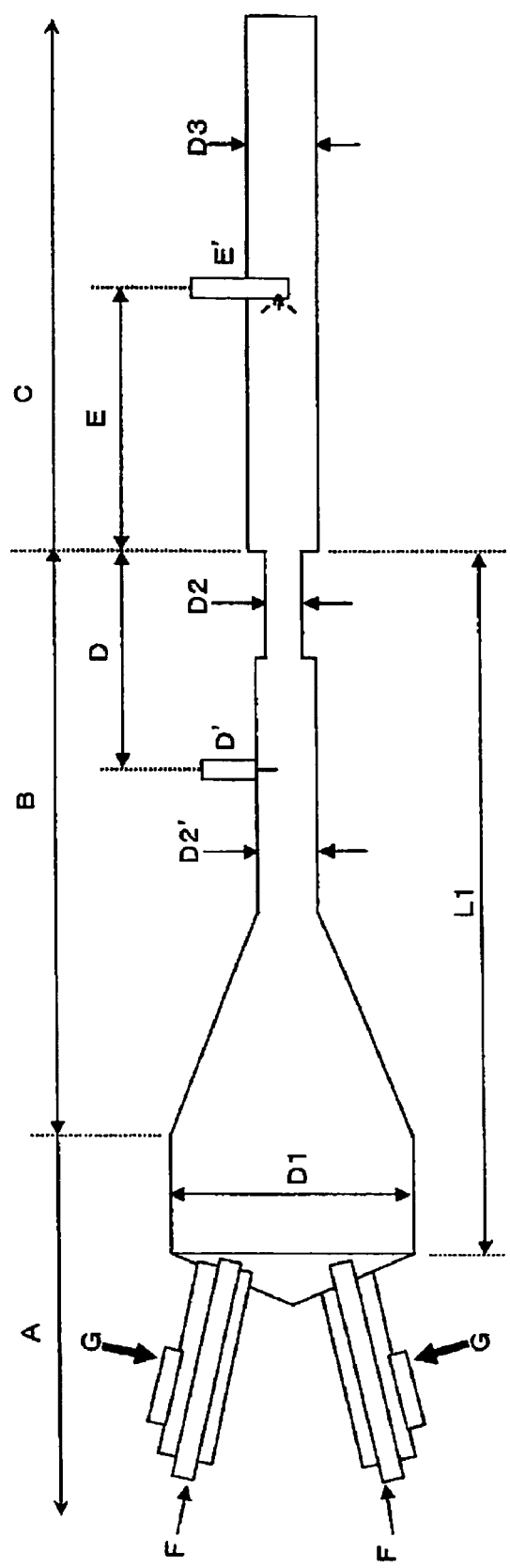
FIG. 1 is a schematic view of an apparatus for producing carbon black.

| MEANING OF SYMBOLS | |
|---|---|
| A: | First reaction zone |
| B: | Second reaction zone |
| C: | Third reaction zone |
| D: | Distance to the position for introduction of carbon black raw material |
| D': | Nozzle for introducing carbon black raw material |
| E: | Distance to the position for stopping the reaction |
| E': | Nozzle for supplying cooling water |

-continued

| MEANING OF SYMBOLS | |
|---|---|
| F: | Nozzle for introducing a fuel |
| G: | Nozzle for introducing air for the fuel |

BEST MODE FOR CARRYING OUT THE INVENTION

Now, embodiments of the propylene resin composition and the propylene resin-molded product of the present invention will be described in detail.

[A] Propylene Resin Composition

The propylene resin composition of the present invention comprises a propylene resin and carbon black. Now, the respective components will be described.

(A1) Propylene Resin

The propylene resin to be used for the propylene resin composition of the present invention may be a propylene homopolymer, or a propylene copolymer of propylene with an olefin comonomer other than propylene (specifically, at least one comonomer selected from the group consisting of ethylene, $C_{4-20}$ olefins and polyenes) The propylene copolymer may be a propylene/other α-olefin random copolymer, or a propylene block copolymer comprising propylene homopolymer blocks, and copolymer blocks having ethylene copolymerized with other α-olefin or copolymer blocks having propylene copolymerized with other α-olefin. The above propylene homopolymer blocks may include crystalline polypropylene containing not more than 3 wt % of ethylene. The α-olefin in the above copolymer blocks may, for example, be ethylene, propylene, butene, hexene, octene, butene or 4-methyl-pentene. The above copolymer blocks are preferably propylene/ethylene copolymer blocks. The propylene resins may be used alone or in combination as a mixture of two or more of them, as the case requires.

In either case of using a propylene homopolymer or using a propylene copolymer as the propylene resin, its MFR is from 5 to 300 g/10 min, preferably from 10 to 280 g/10 min, more preferably from 20 to 250 g/10 min. If the MFR of the propylene resin is less than 5 g/10 min, the MFR of the propylene resin composition thereby obtainable may sometimes be low, whereby the moldability may deteriorate. On the other hand, if it exceeds 300 g/10 min, the impact resistance or the tensile elongation of the propylene resin composition may sometimes be low.

Further, the isotactic pentad fraction in the propylene chain of the propylene resin is preferably at least 0.960, more preferably from 0.980 to 0.995, particularly preferably from 0.985 to 0.995. If the isotactic pentad fraction of the polypropylene resin is less than 0.960, the stiffness or heat resistance of a molded product thereby obtainable may sometimes be low. The isotactic pentad fraction is a fraction of isotactic chains in the form of pentad unit in a polypropylene molecule chain, as measured by the method disclosed in Macromolecules, 6,925 (1973) i.e. the method using $^{13}C$-NMR. In other words, the isotactic pentad fraction is a fraction of propylene monomer units in chains wherein five propylene monomer units are continuously meso-linked. However, attribution of peaks was carried out in accordance with the method disclosed in Macromolecules, 8,687 (1975). Specifically, the isotactic pentad units are measured as a mmmm peak intensity fraction in all absorption peaks in the methylcarbon region in the $^{13}C$-NMR spectrum.

The isotactic pentad fraction can be adjusted by controlling the amount of the electron donor (external and/or internal donor) added to the polymerization catalyst and further by preventing a loss of the electron donor from the polymerization catalyst in such a polymerization process.

The content of the olefin comonomer other than propylene in the propylene resin made of a propylene copolymer is usually from 0.1 to 50 wt %, preferably from 0.2 to 30 wt %, particularly preferably from 0.3 to 20 wt %. If the comonomer content is less than 0.1 wt %, there will be no difference from a propylene homopolymer, and no substantial effect as a propylene copolymer may be obtained. On the other hand, if it exceeds 50 wt %, the handling efficiency may sometimes deteriorate. The type of the comonomer is optional. However, as mentioned above, it may, for example, be ethylene, a $C_{4-20}$ olefin or a polyene. Among them, ethylene, butene, hexene or octene is preferred.

The propylene resin to be used in the present invention is particularly preferably a propylene block copolymer which contains propylene homopolymer blocks and copolymer bocks selected from the group consisting of copolymer blocks formed by copolymerization of ethylene with other α-olefin and copolymer blocks formed by copolymerization of propylene with other α-olefin. Among them, a propylene block copolymer containing ethylene/α-olefin copolymer blocks, is particularly preferred, and especially preferred is a propylene/ethylene block copolymer containing propylene/ethylene copolymer blocks. Carbon black has high affinity to a polymer containing ethylene units. Accordingly, carbon black incorporated to the propylene resin composition of the present invention is selectively dispersed mainly in ethylene/α-olefin copolymer blocks in the polypropylene block copolymer. As a result, a double percolation form will be formed wherein carbon black is unevenly distributed among ethylene/α-olefin copolymer blocks uniformly or non-uniformly dispersed in propylene homopolymer blocks. With such a double percolation form, an electroconductive network of carbon black is likely to be readily formed as compared with a single percolation form wherein carbon black is uniformly distributed in the entire matrix polymer. As a result, it is possible to realize an excellent electroconductive performance even if the amount of carbon black incorporated, is small, and the balance of the electroconductivity of the polypropylene resin composition with various physical properties such as the light weight, flowability and tensile elongation, will be improved.

Further, with respect to MFR of the propylene homopolymer blocks, the lower limit is preferably 20 g/10 min, more preferably 60 g/10 min, further preferably 80 g/10 min, and the upper limit is preferably 300 g/10 min, more preferably 200 g/10 min, further preferably 150 g/10 min, particularly preferably 130 g/10 min. The propylene homopolymer blocks are a crystalline polypropylene portion and thus do not exclude a crystalline polypropylene having ethylene copolymerized in an amount of preferably not more than 3 wt % unless the crystallinity is substantially decreased.

The isotactic pentad fraction in the propylene chain in the propylene homopolymer blocks is preferably at least 0.960, more preferably from 0.980 to 0.995, particularly preferably from 0.985 to 0.995. If the isotactic pentad fraction in the propylene chain in the propylene homopolymer blocks is less than 0.960, the stiffness or heat resistance of a molded product thereby obtainable may sometimes be low.

In the copolymer blocks formed by copolymerization of ethylene with other α-olefin, the ethylene content is preferably from 15 to 60 wt %, more preferably from 20 to 55 wt %, further preferably from 25 to 50 wt %. With respect to MFR of such copolymer blocks, the lower limit is preferably 0.001 g/10 min, more preferably 0.005 g/10 min, further preferably 0.01 g/10 min, particularly preferably 0.3 g/10 min, and the upper limit is preferably 6 g/10 min, more preferably 5 g/10 min, further preferably 4 g/10 min.

In the copolymer block formed by copolymerization of propylene with other α-olefin, the propylene content is preferably from 40 to 85 wt %, more preferably from 45 to 80 wt %, further preferably from 50 to 75 wt %. With respect to MFR of such copolymer blocks, the lower limit is preferably 0.001 g/10 min, more preferably 0.005 g/10 min, further preferably 0.01 g/10 min, particularly preferably 0.3 g/10 min, and the upper limit is preferably 6 g/10 min, more preferably 5 g/10 min, further preferably 4 g/10 min.

If MFR of the propylene homopolymer blocks is outside the above range, the flowability, impact resistance, tensile elongation, etc. of the propylene resin composition may sometimes deteriorate. Further, if MFR of the copolymer blocks is outside the above range, the coating adhesion, impact resistance, tensile elongation, etc. of the propylene resin composition may sometimes deteriorate. If the ethylene content in the copolymer blocks is outside the above range, the low temperature elongation or efficiency in electroconductivity of the propylene resin composition may sometimes deteriorate due to an increase of the glass transition temperature or due to deterioration in the dispersibility of such block components in the propylene resin made of such a propylene copolymer.

MFR of this propylene block copolymer is from 5 to 300 g/10 min, and a suitable MFR range may be set depending upon the molding method. Usually, the lower limit is preferably 10 g/10 min, more preferably 20 g/10 min, and the upper limit is preferably 280 g/10 min, more preferably 250 g/10 min, particularly preferably 120 g/10 min, most preferably 110 g/10 min. In a case where a molded product is obtained by injection molding, the lower limit of MFR is preferably 10 g/10 min, more preferably 20 g/10 min, and the upper limit is preferably 300 g/10 min, more preferably 200 g/10 min, further preferably 150 g/10 min. In a case where a molded product is obtained by extrusion, the lower limit of MFR is preferably 5 g/10 min, and the upper limit is preferably 30 g/10 min, more preferably 25 g/10 min, further preferably 20 g/10 min.

If MFR of the propylene block copolymer of the polypropylene resin is outside the above range, a propylene resin composition obtainable by using it will have an imbalance between MFR and the electrical conductivity, whereby both may not sometimes show good values, such that either performance tends to deteriorate.

MFR of the propylene homopolymer blocks, the copolymer blocks and the propylene block copolymer may be controlled by a conventional method, for example, by controlling the hydrogen concentration in the polymerization reaction system or by cutting molecular chains by means of an organic peroxide or the like during melt-kneading a resin powder obtained by polymerization, by a melt-kneading apparatus such as an extruder.

The ethylene content in the copolymer blocks may suitably be adjusted, for example, by controlling the monomer concentration ratio of ethylene to the α-olefin during the polymerization for copolymer blocks, specifically in the case of a gas phase polymerization by adjusting the gas pressures of the respective monomers taking the polymerization temperature, catalytic performance, etc. into consideration by a conventional method.

It is preferred to select the amount of the propylene homopolymer blocks and the amount of the copolymer blocks in the propylene block copolymer so that as a mode of the propylene resin, the propylene homopolymer blocks constitute a continuous phase (matrix phase), and the copolymer blocks constitute a dispersed phase. With respect to the amount of the propylene homopolymer blocks in the propylene block copolymer, the lower limit is preferably 50 wt %, more preferably 55 wt %, further preferably 60 wt %, and the upper limit is preferably 99 wt %, more preferably 97 wt %, further preferably 95 wt %, still further preferably 90 wt %, particularly preferably 80 wt %. Specifically, the amount of the propylene homopolymer blocks is preferably from 50 to 99 wt %, more preferably from 55 to 85 wt %, further preferably from 60 to 80 wt %. With respect to the amount of the ethylene/propylene copolymer blocks, the lower limit is preferably 1 wt %, more preferably 3 wt %, further preferably 5 wt %, still further preferably 10 wt %, most preferably 20 wt %, and the upper limit is preferably 50 wt %, more preferably 45 wt %, further preferably 40 wt %.

The amount of the copolymer blocks in the propylene block copolymer may be adjusted by controlling the ratio of the polymerization amount of the propylene homopolymer portion to the polymerization amount of the copolymer portion by e.g. the polymerization times. The content of the copolymer blocks may be obtained by a conventional method, for example, by a usual method such as an infrared spectroscopy, $^{13}$C-NMR or temperature raising elution fractionation.

A propylene homopolymer or a propylene copolymer as the propylene resin to be used in the present invention, may be produced by an optional conventional method for polymerization. Specifically, a gas phase polymerization method, a bulk polymerization method, a solution polymerization method or a slurry polymerization method may, for example, be mentioned. In such reactions, polymerization may be carried out by a batch system polymerization in one reactor, or by a continuous system polymerization in combination of a plurality of reactors. Specifically, homopolymerization of propylene or copolymerization of propylene with other α-olefin may be carried out in a single vessel or continuously in plural vessels. Further, it is preferred that firstly, propylene is polymerized alone or copolymerized with a very small amount of ethylene to form a crystalline propylene portion, and then random copolymerization of ethylene with other α-olefin or random copolymerization of propylene with other α-olefin is carried out to form a copolymer portion. In order to adjust MFR of the obtainable polymer to from 5 to 300 g/10 min, it is preferred, for example, to increase a hydrogen partial pressure in the reaction system by introducing a large amount of hydrogen into the reaction system in the case of a gas phase polymerization method.

The polymerization catalyst for producing the propylene homopolymer or the propylene block copolymer to be used in the present invention, is not particularly limited so long as it is capable of producing a polymer having the above-described physical property values (MFR and the isotactic pentad fraction). For example, as a highly stereoregular catalyst, a known specific Ziegler-Natta catalyst (ZN catalyst) or a specific metallocene catalyst may be employed.

Such a highly stereoregular catalyst may, for example, be a so-called ZN catalyst such as a catalyst comprising a solid component (component a) essentially containing titanium, magnesium, halogen and a specific electron donative compound, an organic aluminum compound (component b) and, as an optional component, an electron donative compound (component c), or a so-called metallocene catalyst comprising a metallocene compound (component a') and a promoter (component b') such as an organic aluminumoxy compound, a Lewis acid, an anionic compound or a clay mineral.

As the specific electron donative compound for the solid component (component a) of the above ZN catalyst, a silicic acid ester, a polycarboxylic acid ester such as a substituted succinic acid ester, a phthalic acid ester or a tartaric acid ester, an acetic acid cellosolve ester, a phthalic acid halide, a diether, or an organic alkoxysilicon compound may, for example, be preferably used. Component a may, for example, be a polymerization catalyst component disclosed in each of publications such as JP-A-57-63310, JP-A-60-23404, JP-A-62-187706, JP-A-62-212407, JP-A-63-235307, JP-A-2-160806, JP-A-2-163104, JP-A-3-234707, JP-A-3-706, JP-A-3-294304, JP-A-7-258328, JP-A-8-20607 and JP-A-8-151407.

The organic aluminum compound (component b) in the above ZN catalyst may be a compound represented by the formula $R^1{}_m AlX_{3-m}$ (wherein $R^1$ is a $C_{1-12}$ hydrocarbon group, X is a halogen and m is a number of from 1 to 3). It may, for example, be a trialkylaluminum such as trimethylaluminum, triethylaluminum or triisobutylaluminum, an alkylaluminum halide such as dimethylaluminum chloride, diethylaluminum chloride or ethylaluminum sesquichloride, or an alkylaluminum hydride such as diethylaluminum hydride. Further, an alumoxane such as methylalumoxane or butylalumoxane may also be used.

The electron donative compound (component c) as an optional component in the above ZN catalyst may, for example, be an organic silicon alkoxy compound represented by the formula $(R^2R^3{}_{3-n}Si(OR^4)_n$ (wherein $R^2$ is a $C_{3-20}$, preferably $C_{4-10}$, branched aliphatic hydrocarbon residue or nitrogen-containing hydrocarbon residue, or a $C_{5-20}$, preferably $C_{5-10}$, cyclic aliphatic hydrocarbon residue or cyclic nitrogen-containing hydrocarbon residue, $R^3$ is a $C_{1-20}$, preferably $C_{1-10}$, branched or linear, or cyclic aliphatic hydrocarbon residue or nitrogen-containing aliphatic hydrocarbon residue, $R^4$ is a $C_{1-10}$, preferably $C_{1-4}$, aliphatic hydrocarbon residue, and n is a number of from 1 to 3) such as t-butyl-methyl-dimethoxysilane, t-butyl-methyl-diethoxysilane, cyclohexyl-methyl-dimethoxysilane, dicyclopentyldimethoxysilane or bis(diethylamino)dimethoxysilane, a 2,2-substituted 1,3-diether such as 2,2-diisopropyl-1,3-diether or 2,2-diisobutyl-1,3-diether, or a polycarboxylic acid ester such as butyl phthalate, octyl phthalate, dibutyl 1,2-diisopropyl succinate or dibutyl 1-isopropyl-1-methoxytartarate. Further, a plurality of them may be used in combination. Particularly preferred is a specific organic alkoxysilicon compound represented by the above formula, a combination of such specific organic alkoxysilicon compounds, a 2,2-substituted specific 1,3-diether, a combination of such 2,2-substituted specific 1,3-diethers, a combination of a 2,2-substituted 1,3-diether and a specific organic silicon alkoxy compound represented by the above formula, a carboxylic acid diester derivative such as a 1,2-disubstituted succinic acid ester or a phthalic acid ester, or a combination of a carboxylic acid diester derivative and an organic silicon alkoxy compound represented by the above formula.

Now, the metallocene catalyst will be described. The metallocene compound (component a') in the metallocene catalyst may be (1) one having a carbon crosslinking, (2) one having a silicon crosslinking, (3) one having a german crosslinking group, and a Group 4 transition metal compound having a substituted or unsubstituted cyclopentadiene, indene, fluorene or azulene as a ligand.

As a non-restrictive specific example, the above (1) one having a carbon crosslinking group may, for example, be ethylenebis(2,4-dimethylindenyl)zirconium chloride, ethylenebis(2,4,7-trimethylindenyl)zirconium dichloride, isopropylidene(3-methylindenyl)(fluorenyl)zirconium chloride, or isopropylidene(2-methylcyclopentadienyl)(3-methylindenyl)zirconium dichloride.

The above (2) one having a silicon crosslinking group may, for example, be dimethylsilylenebis(2-methyl-4-phenylindenyl)zirconium dichloride, diphenylsilylene(2-ethyl-4-phenylindenyl)zirconium dichloride, dimethylsilylenebis(2-isopropyl-4-(3,5-diisopropylphenyl)indenyl)zirconium dichloride, dimethylsilylenebis(2-propyl-4-phenanthrylindenyl)zirconium dichloride, silafluorenylbis(2-ethyl-4-(4-t-butylphenyl)indenyl)zirconium dichloride, dimethylsilylenebis(2-ethyl-4-(4-chlorophenyl)azulenyl)zirconium dichloride, dimethylsilylenebis(2-ethyl-4-(4-t-butyl-3-chlorophenyl)azulenyl)zirconium dichloride, or dimethylsilylenebis(2-ethyl-4-(3-fluorobiphenylyl)azulenyl)zirconium dichloride.

As the above (3) one having a german crosslinking group, a compound having silylene of the silicon crosslinking in the above (2) substituted by germylene may be employed. Further, a compound having zirconium substituted by hafnium may be exemplified by itself as a suitable compound. Further, compounds having dichlorides in the exemplified compounds substituted by other halides, methyl groups, isobutyl groups, phenyl groups, hydride groups, dimethylamides or diethylamide groups may also be exemplified as suitable compounds.

The promoter (component b') to be used in the metallocene catalyst may, for example, be (1) an organic aluminum oxy compound, (2) a Lewis acid, (3) an ionic compound or (4) a clay mineral.

The above (1) organic aluminum oxy compound may, for example, be methylalumoxane, isobutylalumoxane, methylisobutylalumoxane, aluminumtetraisobutyl butylboronate, methylaluminum bispentafluorophenoxide or diethylaluminum pentafluorophenoxide.

The above Lewis acid (2) may be a compound represented by $BR^5_3$ (wherein $R^5$ is a phenyl group which may have a substituent such as a fluorine atom, a methyl group or a trifluoromethyl group, or a fluorine atom) such as trifluoroborane, triphenylborane, tris(4-fluorophenyl)borane, tris(3,5-difluorophenyl)borane, tris(4-fluoromethylphenyl)borane, tris(pentafluorophenyl)borane, tris(p-tolyl)borane, tris(o-tolyl)borane, or tris(3,5-dimethylphenyl)borane. Further, an inorganic compound such as magnesium chloride or aluminum oxide may also be exemplified.

The above ionic compound (3) may, for example, be a trialkyl-substituted ammonium salt, an N,N-dialkylanilinium salt, a dialkylammonium salt or a triaryl phosphonium salt. Specifically, the trialkyl-substituted ammonium salt may, for example, be triethylammoniumtetra(phenyl)borate, tri(n-butyl)ammoniumtetra(phenyl)borate, tri(n-butyl)ammoniumtetrakis(pentafluorophenyl)borate, dimethylaniliniumtetrakis(pentafluorophenyl)borate, or dimethylaniliniumtetrakis(pentafluorophenyl)aluminate. The dialkylammonium salt may, for example, be di(1-propyl)ammoniumtetrakis(pentafluorophenyl)borate or dicyclohexylammoniumtetra(phenyl)borate. As an ionic compound other than an ammonium salt, triphenylcarbeniumtetrakis(pentafluorophenyl)borate, triphenylcarbeniumtetrakis(pentafluorophenyl)aluminate or ferroceniumtetra(pentafluorophenyl)borate may, for example, be exemplified.

As the above clay mineral (4), montmorillonite, mica, tainiolite, hectorite or a modified product thereof by acid/base treatment or a composite thereof with another inorganic oxide, may, for example, be exemplified.

Among them, with a promoter employing a clay mineral, the effects of the composition of the present invention are especially remarkable.

The amounts of component (a), component (b) and component (c) to be used in the polymerization of a propylene homopolymer or a propylene copolymer to be used in the present invention, are optional so long as the effects of the present invention are obtainable, but they are usually preferably within the following ranges. The amount of component (a) is from 0.01 to 1,000 mol.ppm to propylene supplied to the reactor. The amount of component (b) is within a range of from 0.1 to 10,000 mol.ppm, preferably from 1 to 1,000 mol.ppm, more preferably from 10 to 300 mol.ppm, to propylene supplied to the reactor. Further, the amount of component (c) is within a range of from 0 to 100 mol.ppm, preferably from 0 to 50 mol.ppm, particularly preferably from 0 to 20 mol.ppm, to propylene supplied to the reactor.

On the other hand, with respect to component (a') and component (b') in the case of the metallocene catalyst, the amount of component (a') is usually from 0.001 to 100 mol.ppm to propylene supplied to the reactor, and the amount of component (b') is usually from 10 to 100,000 (mol/mol) to component (a').

(A2) Carbon Black

The carbon black to be used in the present invention is not carbon black of an amorphous structure poor in electroconductivity to be used as a coloring agent or a compounding ingredient, but is carbon black having a surface layer of graphite structure. Further, the carbon black to be used in the present invention is one which simultaneously satisfies a 24M4DBP absorption of at least 130 cm$^3$/100 g, a dehydrogenation amount of at most 1.2 mg/g at 1,500° C. for 30 minutes and a crystallite size Lc of from 10 to 17 Å as its structural characteristics. Further, it preferably has a nitrogen absorption specific surface area of from 150 to 300 m$^2$/g, DBP absorption of from 150 to 400 cm$^3$/100 g, an average particle size of from 14 to 24 nm and a CTAB adsorption specific surface area of from 120 to 220 m$^2$/g.

The definitions of various physical properties such as the nitrogen adsorption specific surface area, DBP absorption, dehydrogenation amount, crystalline size, CTAB adsorption specific surface area, 24M4DBP absorption (compressed DBP absorption), average particle size, $D_{mod}$/24M4DBP and oxygen-containing functional group-density, and their preferred ranges, are as follows.

Nitrogen Adsorption Specific Surface Area

The nitrogen adsorption specific surface area is measured in accordance with JIS K6217 (unit: m$^2$/g).

The nitrogen adsorption specific surface area of carbon black is an index value for the primary particle size of carbon black. The larger the nitrogen adsorption specific surface area, the smaller the primary particle size. The smaller the primary particle size of carbon black, the better the electroconductivity of the obtainable propylene resin composition, but the flowability decreases. In the present invention, it is possible to satisfy both the electrical conductivity and flowability of the obtainable propylene resin composition by using carbon black having a nitrogen adsorption specific surface area of from 150 to 300 m$^2$/g, preferably from 200 to 290 m$^2$/g, more preferably from 204 to 288 m$^2$/g.

DBP Absorption and 24M4DBP Absorption

The DBP absorption (cm$^3$/100 g) and the 24M4DBP absorption (cm$^3$/100 g) are measured in accordance with JIS K6217.

Carbon black is usually in the form of secondary particles wherein primary particles are chained like a bunch of grapes to form a unique chain so-called "structure". In space portions in such a grape-like chain structure, DBP (dibutyl phthalate)

will be occluded. Accordingly, the DBP absorption and the 24M4DBP absorption are important index values for the characteristics of carbon black.

In order to improve the electrical conductivity and flowability of the obtainable propylene resin composition, the carbon black to be used in the present invention has a 24M4DBP absorption of at least 130 cm$^3$/100 g, preferably at least 140 cm$^3$/100 g, more preferably at least 145 cm$^3$/100 g and preferably at most 260 cm$^3$/100 g, more preferably at most 200 cm$^3$/100 g, further preferably at most 160 cm$^3$/100 g.

Further, the carbon black to be used in the present invention preferably has a DBP absorption of at least 150 cm$^3$/100 g, more preferably at least 155 cm$^3$/100 g and preferably at most 400 cm$^3$/100 g, more preferably at most 250 cm$^3$/100 g, further preferably at most 230 cm$^3$/100 g, particularly preferably at most 210 cm$^3$/100 g.

If such a 24M4DBP absorption or DBP absorption is too small, the electroconductivity may sometimes deteriorate when formed into a propylene resin composition. On the other hand, if it is too large, the flowability of the propylene resin composition may sometimes deteriorate.

In the case of a carbon black-containing propylene resin composition, the 24M4DBP absorption measured by partially rupturing the linkage in the structure by exerting a pressure may be preferred to the DBP absorption as an index for the electrical conductivity under such a condition that an energy (shearing) will be exerted during the kneading.

Dehydrogenation Amount

The dehydrogenation amount at 1,500° C. for 30 minutes (hereinafter referred to simply as "dehydrogenation amount") of carbon black is an amount of hydrogen in a gas generated during heating of carbon black at 1,500° C. for 30 minutes under vacuum, and specifically, it is obtained as follows.

About 0.5 g of carbon black is accurately weighed and put into an alumina tube, which is vacuumed to 0.01 Torr (1.33 Pa). Then, the reduced pressure system is sealed and held in an electric furnace at 1,500° C. for 30 minutes to decompose and evaporate an oxygen compound or a hydrogen compound present in the carbon black. The evaporated component is, via a meter ring pump, collected into a gas collecting tube of a predetermined capacity. The amount of gas is obtained from the pressure and temperature, and at the same time, the composition is analyzed by gas chromatograph to obtain the amount (mg) of hydrogen ($H_2$) generated, whereupon a value converted to the amount of hydrogen generated per gram of carbon black, is calculated (unit: mg/g).

The dehydrogenation amount of carbon black to be used in the present invention is at most 1.2 mg/g, preferably at most 1.0 mg/g, more preferably at most 0.8 mg/g, whereby it becomes possible to increase the electroconductivity of a propylene resin composition having such carbon black incorporated. In the present invention, the dehydrogenation amount of carbon black is preferably as low as possible within a range of at most 1.2 mg/g, but usually, the lower limit is at least 0.1 mg/g for a reason such as an industrial economical efficiency.

If the dehydrogenation amount is larger than 1.2 mg/g, the crystal development in the vicinity of the surface of carbon black tends to be inadequate, and acidic functional groups tend to attach on the surface, for example, in a step of granulation and drying carbon black, and when formed into a propylene resin composition, the electrical conductivity may sometimes deteriorate.

Crystallite Size Lc

The crystallite size Lc is measured by means of an X-ray diffraction apparatus (RINT-1500 model, manufactured by Rigaku Corporation). The measurement was carried out by using Cu for the X-ray tube at an X-ray tube voltage of 40 KV at a tube current of 250 mA. A carbon black sample was packed in a sample plate attached to the apparatus, the measuring angle (2θ) was from 10° to 60°, the measuring speed was 0.5°/min, and the peak position and the half value width were calculated by a software of the apparatus. Further, for calibration of the measuring angle, an X-ray standard silicon was used. Using the results thus obtained, Lc was obtained by the Scherrer's formula: (Lc(Å)=K×λ/β×cos θ (where K: form factor constant 0.9, λ: characteristic X-ray wavelength CuKα 1.5418 (Å), β: half value width (radian), θ: peak position (degree))).

In the present invention, carbon black having a crystallite size Lc of from 10 to 17 Å, preferably from 11 to 16 Å, is employed. By adjusting the crystallite size within this range, it is possible to improve both the electroconductivity and flowability of the obtainable propylene resin composition. If the crystallite size Lc is too large, the electroconductivity may sometimes deteriorate when formed into a propylene resin composition. On the other hand, if the crystallite size Lc is too small, no adequate electroconductivity may sometimes be obtainable.

Average Particle Size

The average particle size of carbon black is obtained by a transmission electron microscope. Specifically, a carbon black sample is dispersed in chloroform for 10 minutes by an ultrasonic dispersion machine with 150 kHz and 0.4 kW to prepare a dispersed sample, which is sprinkled and fixed on a carbon-reinforced support film. The sprinkled particles are photographed by a transmission electron microscope to have an enlarged image of from 50,000 to 200,000 magnifications, whereby by means of an Endter apparatus, the particle sizes of randomly chosen at least 1,000 carbon black particles were measured, and the average value thereof is taken as the average particle size.

The average particle size (the average particle size by a transmission electron microscope) of carbon black to be used in the present invention is optional. However, it is preferably from 14 to 24 nm, particularly preferably from 15 to 18 nm. If the average particle size is too small, the dispersibility in the propylene resin composition tends to be poor. On the other hand, if it is too large, the electroconductivity of the propylene resin composition may sometimes deteriorate.

CTAB Adsorption Specific Surface Area

The CTAB adsorption specific surface area (m$^2$/g) is measured in accordance with JIS K6217.

In the present invention, it is preferred that the CTAB adsorption specific surface area of carbon black is adjusted to be from 120 to 200 m$^2$/g, particularly preferably from 150 to 200 m$^2$/g. By adjusting it within this specific range, it is possible to improve both the electrical conductivity and flowability of the propylene resin composition. If the CTAB specific surface area is too small, the electrical conductivity may sometimes deteriorate. On the other hand, if it is too large, the dispersibility in the propylene resin composition may sometimes deteriorate.

The ratio ($D_{mod}$/24M4 DBP) of the stokes mode diameter ($D_{mod}$) to 24M4DBP absorption is from 0.6 to 0.9. STOKES MODE DIAMETER ($D_{mod}$) AND STOKES MODE HALF VALUE WIDTH ($D_{1/2}$)

The stokes mode diameter ($D_{mod}$) and the stokes mode half value width ($D_{1/2}$) are obtained by the following measuring method.

Figure 2:
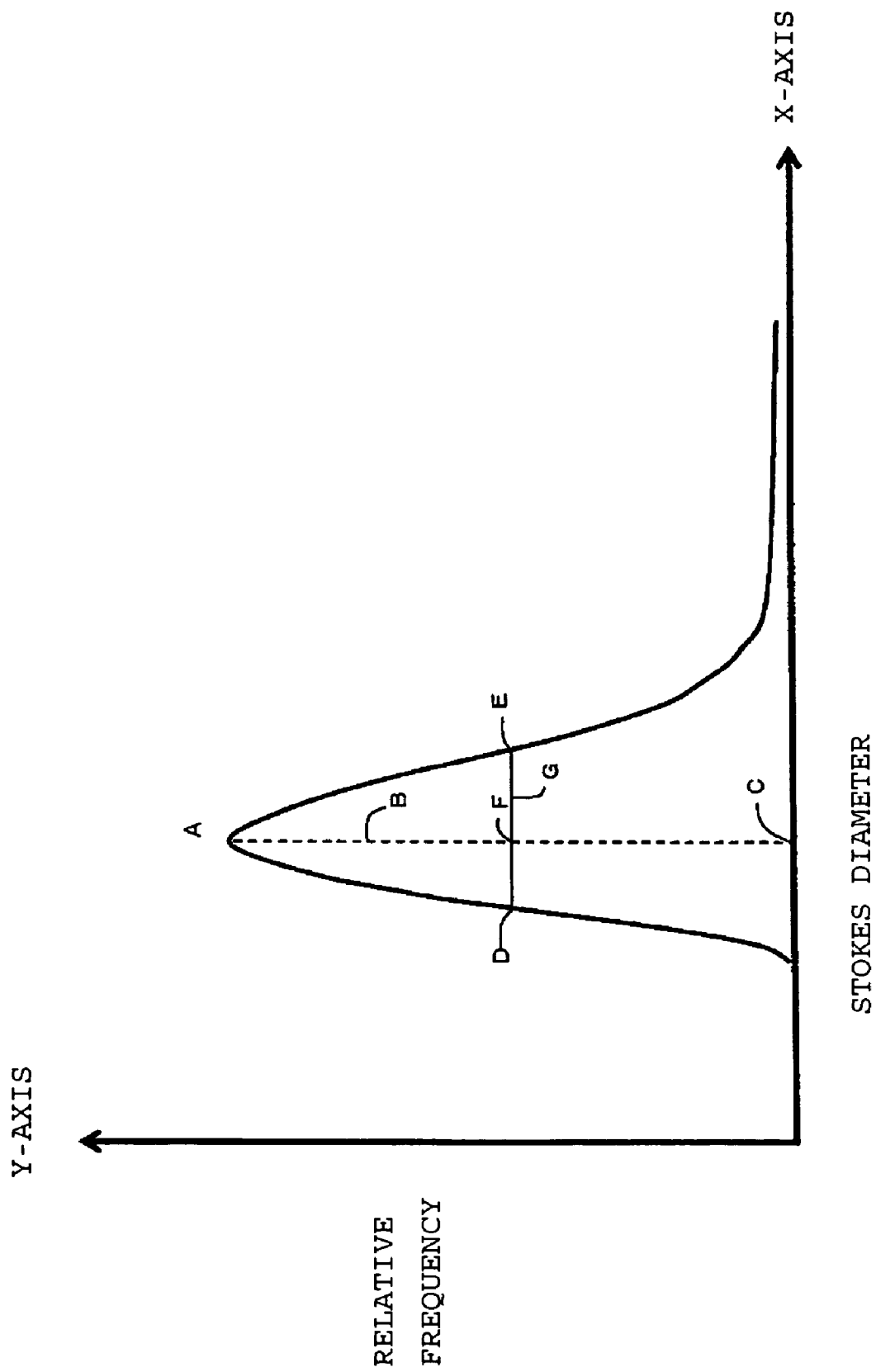
FIG. 2 is a histogram of the relative occurrence frequency to the stokes-corresponding diameter, to be used for the measurement of the CTAB adsorption specific surface area.

Accurately weighed carbon black was added to a 20 vol % ethanol aqueous solution having three drops of a surfactant ("NONIDET P-40" manufactured by Sigma Chemical, to prepare a test liquid having a carbon black concentration of 0.01 wt %. This sample liquid was subjected to dispersion treatment for 20 minutes by means of an ultrasonic cleaning machine ("ULTRASONIC STIRRING BATH" manufactured by Lakomanufacturing Co.) to obtain a carbon black slurry. On the other hand, into a centrifugal settling type particle size distribution measuring apparatus ("BI-DCP PARTICLSIZER" manufactured by Brook Haven Instruments), 10 ml of a spinning liquid (pure water) was introduced, and further, 1 ml of a buffer liquid (a 20 wt % ethanol aqueous solution) was introduced. Then, 1 ml of the carbon black slurry prepared as described above was introduced, followed by centrifugal settling at a rotational speed of 10,000 rpm, whereby the stokes-corresponding diameter was calculated with an absolute specific gravity of 1.78 g/cm$^3$, and as shown in FIG. 2, a histogram of occurrence frequency relative to the stokes-corresponding diameter was prepared (however, the after-mentioned Comparative Example 9 and 10 were carried out at a rotational speed of 4,000 rpm and with an absolute specific gravity of 1.84 g/cm$^3$). From peak A of the histogram, a linear line B is drawn in parallel with Y-axis and its intersecting point with X-axis of the histogram is designated as C. The stokes diameter at the intersecting point C at that time is the stokes mode diameter ($D_{mod}$). Further, the midpoint of the linear line B is designated as F, and a linear line G is drawn in parallel with X-axis to pass through the midpoint F. The linear line G intersects with the distribution curve of the histogram at two points D and E. The absolute value of the difference between the respective stokes diameters at D and E at that time is the stokes mode half value width ($D_{1/2}$).

In the present invention, further, carbon black with $D_{mod}$/24M4DBP being within a range of from 0.6 to 0.9 is preferred. As mentioned above, the carbon black is composed of secondary particles (agglomerates) having a plurality of primary particles chained, and the 24M4DBP absorption is used as an index for the degree of development of such agglomerate structure (structure). Further, as another index to measure a characteristic of the carbon black, a stokes diameter is known. As such a stokes diameter, a diameter (a mode diameter: $D_{mod}$) obtained by a centrifugal settling method (DCP) is usually employed on the assumption that the carbon black agglomerates are pseudospherical following the stokes rules. And, as an index for the distribution of $D_{mod}$, the half value width of $D_{mod}$ ($D_{1/2}$) is employed.

Heretofore, by using such indices or their ratio ($D_{1/2}/D_{mod}$) and other physical property values as indices for physical properties of carbon black, improvements in the physical properties, processabilities, etc. of the carbon black itself, rubber and the resin composition, have been made. However, heretofore, these numerical values have been evaluated independently of one another, and the characteristics of carbon black have not been adequately grasped. For example, only with the stokes mode diameter ($D_{mod}$) of carbon black, the degree of development of its structure can not be determined unambiguously, and there has been a problem that even with carbon black having the same $D_{mod}$, there is a difference in electroconductivity, and no adequate improvement has been attained particularly for carbon black to be added to an electroconductive resin composition.

Under the circumstances, the present inventors have conducted an extensive study, and as a result, it has been found possible to realize an electroconductive resin composition having an excellent balance of electroconductivity and flowability by using carbon black with $D_{mod}$ being within a specific numerical range to the 24M4DBP absorption showing the degree of development of the structure, i.e. carbon black with a value of $D_{mod}$/24M4DBP being within a specific range, as a filler for an electroconductive resin composition.

Such a numerical value represented by $D_{mod}$/24M4DBP is one showing the degree of the agglomerate diameter to the degree of development of the structure of carbon black. The lower the numerical value, i.e. the higher the degree of development of the structure to the agglomerate diameter of the same size, the higher the density of the primary particles of carbon black. If this numerical value is too low, a decrease in the flowability of the resin composition due to a decrease in the affinity with the resin, or a decrease in the electroconductivity of the resin composition due to a decrease in the dispersibility of carbon black in the resin composition, may sometimes occur. On the other hand, if it is too high, the electroconductivity of carbon black itself is likely to be low, and due to an increase of the amount of carbon black to the electroconductive resin composition in order to impart a desired level of electroconductivity, the mechanical properties, etc. of the resin composition may sometimes deteriorate. Accordingly, in the carbon black of the present invention, $D_{mod}$/24M4DBP is preferably at least 0.6 and at most 0.9.

Oxygen-Containing Functional Group Density (1,500° C.×30 min) CO emission (hereinafter referred to simply as "CO emission") and (1,500° C.×30 min) CO$_2$ emission (hereinafter referred to simply as "CO$_2$ emission") are the amounts of CO and CO$_2$, respectively, in a gas generated during the heating of carbon black at 1,500° C. for 30 minutes in vacuo, and specifically, they are measured as follows.

About 0.5 g of carbon black is accurately weighed and put into an alumina tube, which is vacuumed to 0.01 Torr (1.3 Pa). Then, the reduced pressure system is sealed and held for 30 minutes in an electric furnace at 1,500° C. to decompose and evaporate an oxygen compound or a hydrogen compound present in the carbon black. The evaporated component is, via a meter ring pump, collected in a gas collecting tube of a predetermined capacity. The amount of gas is obtained from the pressure and the temperature, and at the same time, the composition is analyzed by gas chromatograph to obtain the emission (mg) of carbon monoxide (CO) and carbon dioxide (CO$_2$), whereupon values converted to CO and CO$_2$ per gram of carbon black are calculated (unit: mg/g).

Further, the emission of each gas obtained is converted to μmol/g, and the oxygen-containing functional group density is obtained by the following formula.

Oxygen-containing functional group density (μmol/m$^2$)=

[CO emission (μmol/g)+CO$_2$ emission (μmol/g)]

/nitrogen adsorption specific surface area (m$^2$/g)

In addition to the above, in the present invention, it is preferred that the oxygen-containing functional group density as defined by the following formula is adjusted to be at most 3 μmol/m$^2$.

Oxygen-containing functional group density (μmol/m$^2$)=

[CO emission (μmol/g)+CO$_2$ emission (μmol/g)]

/nitrogen adsorption specific surface area (m$^2$/g)

Here, this numerical value will be explained. On the surface of carbon black, functional groups containing oxygen to some extent are present, and when they are heated, carbon monoxide (CO) and carbon dioxide ($CO_2$) will be emitted. For example, when carbonyl groups (ketones, quinones, etc.) are present, CO will mainly be emitted by their decomposition, and when carboxyl groups and their derivatives (esters, lactones, etc.) are present, $CO_2$ will likely be emitted. Namely, by obtaining the amounts of gases generated, the amounts of functional groups present on the surface of carbon black are presumable. On the other hand, it is known that for improvement of the electrical conductivity of carbon black, the amount of such functional groups should better be small. However, for these functional groups, a numerical value based on the amount of gas emitted per weight of carbon black has been employed. In other words, it has been a common understanding that the amount of functional groups per weight of carbon black is influential over the electrical conductivity.

Whereas, as a result of a further extensive study, the present inventors have found that from a concept separate from the dispersibility, also with respect to the electrical conductivity, as the amount of such functional groups, not a numerical value per weight of carbon black, but the number per unit surface area is rather effective to satisfy the electroconductivity, or both the electroconductivity and flowability, of the resin composition.

The reason is not clearly understood in detail, but it is considered that when an electric current flows in the resin composition, functional groups locally present on the surface of the carbon black will hinder electron transfer between the secondary particles of carbon black, whereby rather than the absolute amount per weight, the number (the density) per unit surface area is influential over the electrical conductivity.

Namely, the oxygen-containing functional group density shows the amount of functional groups containing oxygen per unit surface area of carbon black. Accordingly, the lower such a numerical value, the better. In a case where such a numerical value is high, for such a reason, the electrical conductivity of the resin composition containing carbon black will be low. Here, the lower such a numerical value the better from the viewpoint of the electrical conductivity. However, if it is too low, as mentioned above, the dispersibility is likely to be low, and the electrical conductivity or flowability rather tends to deteriorate, such being disadvantageous from the viewpoint of the industrial economical efficiency. Accordingly, the oxygen-containing functional group density is preferably at least 0.1 $\mu mol/m^2$.

A method for producing carbon black to be used in the present invention is optional, and an oil furnace method, an acetylene method or an activation method may, for example, be mentioned. Among them, an oil furnace method is preferred, since carbon black can be produced at a low cost and in good yield.

Now, an oil furnace method will be described as an example of the method for producing carbon black to be used in the present invention.

An example of the apparatus for producing carbon black to be used in the present invention, is shown in FIG. 1. This apparatus is an apparatus for producing carbon black by an oil furnace method, and it comprises a first reaction zone A wherein a fuel is burned to generate a high temperature combustion gas stream, a second reaction zone B which is connected to the downstream of the first reaction zone and provided with a nozzle for introducing a carbon black raw material, and a third reaction zone C which is connected to the downstream of the second reaction zone and provided with a nozzle to supply cooling water or the like into the furnace to stop the reaction for forming carbon black.

Firstly, from fuel introduction nozzles F, a fuel is introduced in the form of a mist, and it is mixed with air for combustion introduced from nozzles G for introduction of air for combustion to obtain a high temperature combustion gas stream. The temperature of the combustion gas stream is from about 1,300 to 2,000° C. The fuel to be used for forming the high temperature combustion gas is optional, but a liquid fuel such as heavy oil, light oil, gasoline or kerosine oil, or a gas fuel such as natural gas, propane or hydrogen, may, for example, be mentioned. The generated high temperature combustion gas stream is passed through a production furnace having a gradually converged shape, whereby the gas flow rate will be increased, and a turbulent flow energy in the furnace will be improved.

The carbon black raw material to be introduced at the second reaction zone B may, for example, be a coal-derived hydrocarbon such as creosote oil, or a petroleum-derived hydrocarbon such as ethylene bottom oil. By adjusting the position for introducing the carbon black raw material or the amount of the raw material, it is possible to adjust the particle size (the primary particle size) or structure of the carbon black.

The carbon black formed in the second reaction zone B is contacted and quenched with cooling water or the like in the third reaction zone C, whereby the reaction for forming carbon black will be stopped. Then, usually, the gas and the carbon black are separated by a collecting apparatus such as bag filter or cyclone to obtain carbon black. Further, it is common that the obtained carbon black is granulated into granules of about 1 mm by a pin type wet granulator or the like by using water or the like as a medium for granulation, followed by a step of drying by means of a rotary dryer.

In order to produce carbon black to be used in the present invention, i.e. carbon black having a 24M4DBP absorption of at least 130, a dehydrogenation amount of at most 1.2 mg/g and a crystallite size Lc of from 10 to 17 Å, the position of the nozzle D' for introducing a carbon black raw material in the above-mentioned second reaction zone B and the position of the nozzle E' for supplying cooling water in the third reaction zone C, are adjusted to bring the retention time of carbon black in the furnace within a specific range, whereby as mentioned above, the 24M4DBP absorption and the specific surface area of carbon black are brought to values within the specific ranges, Lc is brought to have a specific small value without being made to be excessively large, and dehydrogenation at the surface of the carbon black particles is brought to an advanced state. Specifically, the temperature in the furnace is adjusted to be from 1,500 to 2,000° C., preferably from 1,600 to 1,800° C., and the retention time in the furnace of carbon black i.e. the time required for the transfer from the raw material introduction point to the reaction termination point (in FIG. 1, the time required for the transfer of the carbon black raw material for the distance D for the introduction of the carbon black raw material and the distance E for the termination of the reaction) is from 40 to 500 mmsec, preferably from 50 to 200 mmsec. Further, in a case where the temperature in the furnace is low at a level of lower than 1,500° C., the retention time in the furnace may be adjusted to be more than 500 mmsec and at most 5 seconds, preferably from 1 to 3 seconds.

With carbon black to be used in the present invention, the dehydrogenation amount is particularly small, and accordingly it is preferred to employ a method wherein the temperature of the high temperature combustion gas stream in the furnace is brought to a high temperature of at least 1,700° C., or to prolong the retention time at a high temperature by a reaction heat generated by burning hydrogen, etc. at the surface of carbon black by further introducing oxygen into the furnace on the down stream side than the nozzle for supplying the carbon black material. By such a method, crystallization in the vicinity of the surface of carbon black and dehydrogenation in the interior of carbon black can effectively be carried out, such being desirable.

(A3) Ethylene Elastomer

In the present invention, an ethylene elastomer may be incorporated. Carbon black has an extremely high affinity to a polymer containing ethylene units. Accordingly, carbon black incorporated to the polypropylene resin composition of the present invention will be selectively dispersed in the ethylene elastomer component. As a result, carbon black is unevenly distributed in the elastomer component uniformly or non-uniformly dispersed in the propylene homopolymer blocks to form a double percolation form. With such a double percolation form, an electroconductive network of carbon black can easily be formed as compared with a single percolation form having carbon black uniformly dispersed in the entire matrix polymer. As a result, it is possible to realize a good electroconductive performance even if the blend amount of carbon black is small. As a result, improvement in the balance of the electrical conductivity of the polypropylene resin composition with various physical properties such as light weight, flowability and tensile elongation, can be expected.

The ethylene elastomer to be used in the present invention is an ethylene elastomer obtained by copolymerizing ethylene with other α-olefin. Such α-olefin to be copolymerized with ethylene is not particularly limited. However, a $C_{3-10}$ α-olefin is preferred for a reason of the compatibility with polypropylene or the toughness as an elastomer. The ethylene elastomer to be used in the present invention may be a binary copolymer having only one type of α-olefin copolymerized with ethylene, or a multicomponent copolymer having two or more α-olefins copolymerized with ethylene.

Further, in the ethylene elastomer to be used in the present invention, the ethylene content in the copolymer is at least 50 wt %, preferably from 50 to 80 wt %. If the ethylene content in the copolymer is less than 50 wt %, the compatibility with the polypropylene may be good, but the electrical conductivity deteriorates due to a decrease in the adsorption property of carbon black, such being undesirable. The upper limit of the ethylene content in the copolymer is not particularly limited, but if it exceeds 80 wt %, the compatibility with polypropylene tends to be remarkably low. MFR of the ethylene elastomer to be used in the present invention is at least 1.0 (g/10 min), preferably from 2.0 to 100 g/10 min, more preferably from 3 to 80 g/10 min. If MFR of the ethylene elastomer is less than 1.0/10 min, the dispersibility tends to be low due to an excessive viscosity ratio to the propylene. Not only that, if the resin composition is formed into a molded product, for example, by injection molding, the orientation degree of the elastomer component tends to be low, and formation of a network of the electroconductive phase in the double percolation form tends to be inadequate, and consequently, the electrical conductivity deteriorates, such being undesirable.

The density (g/cc) of the ethylene elastomer to be used in the present invention is at most 0.890 g/cc, preferably at most 0.885 g/cc. If the density exceeds 0.890 g/cc, the toughness as an elastomer tends to be poor, such being undesirable. The lower limit of the density of the elastomer is not particularly limited, but if the density is excessively low, such an elastomer has a poor handling efficiency such as stickiness, whereby not only the productivity at the time of producing the resin composition of the present invention, but also the productivity at the time of producing the elastomer will be poor. Therefore, from the reason of industrial economical efficiency, the density is not required to be excessively low, and usually, one having a density of at least 0.850 g/cc is preferred.

The purpose of using an ethylene elastomer in the present invention is to realize an efficient electroconductive performance utilizing the above-mentioned double percolation form. For the carbon black-localized phase constituting such a double percolation form, it is effective to use a polymer having an ethylene component, since carbon black has an extremely high adsorbing property for ethylene. On the other hand, the compatibility with a propylene resin is an important factor from the viewpoint of the dispersibility of the carbon black-localized phase. Therefore, the present inventors have conducted an extensive study for the balance between the adsorption property of carbon black and the dispersibility in the propylene resin, and as a result have found it possible to form an ideal double percolation form capable of developing a particularly high level of electroconductive efficiency, by employing an ethylene elastomer having a specific structure and a propylene block copolymer having a specific structure.

Namely, as the copolymer blocks in the propylene block copolymer, it is preferred to use ones having a relatively low content of an ethylene component, so that the copolymer component serves as a compatibilizing agent to improve the compatibility of the ethylene elastomer with the propylene homopolymer blocks. As a separately added ethylene elastomer, it is preferred to employ one having a relatively high content of an ethylene component so as to improve the adsorption property of carbon black. Thus, it has been found possible to thereby form an ideal double percolation form capable of developing a particularly high level of electroconductive efficiency.

In the present invention, it is preferred that the propylene resin has a specific structure also in an embodiment where a resin composition is constituted solely by a propylene resin and carbon black. Further, on the basis of the above concept, an ethylene elastomer having a specific structure is incorporated, whereby it becomes possible to realize a further higher electroconductive efficiency. Thus, by incorporating an ethylene elastomer, it becomes possible to let the ethylene elastomer play a role of a carbon black-localized phase to develop a double percolation form. For this purpose, the molecular weight of the copolymer blocks in the propylene block copolymer may be increased within a range not to deteriorate the compatibility with the propylene homopolymer blocks. As a result, it is also possible to obtain a resin composition excellent in the flowability during the injection molding or in the moldability such as flow marks or flatness.

In a case where an ethylene elastomer is used in the present invention, incorporation of one type of ethylene elastomer, and if necessary, incorporation of two or more ethylene elastomers, are included as embodiments to constitute the resin compositions of the present invention.

As such an ethylene elastomer, a conventional elastomer may be used so long as the above-described specific structural requirements are satisfied. For example, "TAFMER" manufactured Mitsui Chemicals, Inc., "ENGAGE" or "AFINITY" manufactured by DuPont Dow Elastomers, "DYNARON" manufactured by JSR Corporation, or "EXACT" manufactured by Exxon Mobil Chemical may, for example, be mentioned.

(A4) Blend Ratio

The blend ratio of the propylene resin and carbon black constituting the propylene resin composition of the present invention is such that by a weight ratio, the propylene resin: the carbon black is preferably from 98:2 to 50:50, more preferably from 97:3 to 70:30, further preferably from 96:4 to 80:20. If the blend ratio is out of range, the electroconductivity, flowability, etc. of the propylene resin composition may sometimes deteriorate.

Further, in a case where the polypropylene resin composition of the present invention further contains an ethylene elastomer, the blend ratio of the propylene resin:the carbon black:the ethylene elastomer is preferably 10 to 80:2 to 50:10 to 50, more preferably 20 to 75:5 to 40:20 to 40, further preferably 30 to 73:7 to 30:20 to 40, by weight ratio. If the weight ratio is out of range, various physical properties such as the electrical conductivity, flowability, rigidity, heat resistance, light weight, etc. of the resin composition tend to deteriorate, such being undesirable.

The propylene resin composition of the present invention can be obtained by blending the above-mentioned specific propylene resin and the specific carbon black in a specific blend ratio. The carbon black to be used in the present invention is excellent in the dispersibility in a propylene resin as compared with conventional carbon black, whereby by blending it within the above-mentioned range of the blend ratio, it is possible to obtain a propylene resin composition excellent in the balance of the electrical conductivity and the tensile elongation. Further, when the balance of the electrical conductivity and flowability of the propylene resin composition is taken into consideration, it is more preferred that MFR of the propylene resin to be used and the amount of carbon black, preferably oil furnace carbon black, are selected for blending to be a combination satisfying the following formula (i):

$$Y \geq 2X+1 \qquad (i)$$

where Y is MFR (unit: g/10 min) of the propylene resin, and X is the blend ratio (unit: wt %) of the carbon black.

(5) Optional Components

To the propylene resin composition of the present invention, other components may be incorporated, as the case requires within a range not to substantially impair the effects of the present invention. Such other blend components may, for example, be reinforcing fillers represented by e.g. talc, calcium carbonate, mica, synthetic mica, wollastonite, smectites such as montmorillonite, whispers, glass fibers or carbon fibers, coloring pigments, phenol type, sulfur type or phosphorus type antioxidants, antistatic agents, photostabilizers such as hindered amine, ultraviolet absorbers, various nucleating agents such as organic aluminum or talc, dispersing agents, neutralizing agents, blowing agents, copper inhibitors, lubricants or flame retardants.

(B) Production Method

The method for producing the propylene resin composition of the present invention is not particularly limited, and the composition may be produced by a conventional method by mixing and melt-kneading various blend components.

Namely, the propylene resin composition of the present invention can be obtained by blending the respective blend components in the above-mentioned blend proportions, followed by kneading and granulating by means of a single screw extruder, a twin screw extruder, a Banbury mixer, a roll mixer, a Brabender Plastgraph or a kneader. When industrial economical efficiency, etc. are taken into account, a continuous system single screw extruder or twin screw extruder is preferred, and from the viewpoint of the productivity, a twin screw extruder is most preferred (C) Molded Product of Propylene Resin The propylene resin composition of the present invention thus obtained is excellent in the balance of the flowability, electrical conductivity and tensile elongation and may be formed into a molded product having an optional shape by a molding method selected from injection molding, compression molding, injection compression molding and extrusion molding. As the molding method among them, injection molding, injection compression molding or extrusion molding is preferred.

Characteristics of Molded Product of Propylene Resin and Effects Thereof

The propylene resin composition of the present invention has a volume resistivity of from $10^2$ to $10^9$ Ω·cm. If the volume resistivity exceeds $10^9$ Ω·cm, it can not be said that it has a sufficient electroconductive performance. On the other hand, if it is less than $10^2$ Ω·cm, the network of carbon black tends to be too firm that the flowability of the resin composition tends to be poor, such being undesirable. Particularly when its MFR is from 1 to 80 g/10 min, the propylene resin composition of the present invention is useful as a material having a high level of electroconductivity capable of being shaped by an industrially economically excellent injection molding method, for molded products for various applications such as IC trays, electromagnetic shielding or electrostatic coating. If MFR exceeds 80 g/10 min, the balance of the electrical conductivity and impact resistance tends to be poor, and if it is less than 1 g/10 min, a trouble in molding such as short shot or formation of burr is likely to occur during the injection molding, such being undesirable.

The propylene resin composition of the present invention is excellent in the balance of the electrical conductivity, container-moldability, light weight and mechanical properties especially when MFR is from 0.01 to 20 (g/10 min). Therefore, it is useful as a material having a high level of electrical conductivity and capable of being shaped by conventional methods such as industrially economically excellent extrusion molding and the subsequent container-molding method such as vacuum molding, vacuum/pressure forming, press-molding, plug assist molding or heat forming on one side, for molded products for various applications, such as IC trays, electromagnetic shielding or carrier tapes.

EXAMPLES

Now, the present invention will be described in further detail with reference to Examples. However, it should be understood that the present invention is by no means restricted to such Examples. Further, various physical properties in the following Examples were measured as follows.

Methods for Measuring Physical Properties (1) MFR (unit: g/10 min) Measured in accordance with JIS K7210 at 230° C. under a load of 21.18 N.

(2) Volume resistivity (unit: Ω·cm): A flat sheet (340 mm×100 mm) having a thickness of 3 mm was formed by injection molding, and the flat sheet was cut in a longitudinal direction so that the width became 20 mm. At positions of 45 to 55 mm in a longitudinal direction from the center position in the longitudinal direction of the cut flat plate, a silver paste preliminarily dissolved in butyl acetate (silver paste for microscope "SILVEST P255", manufactured by NISSHIN EM CORPORATION) was applied by means of a brush so that the interelectrode distance would be 90 mm. A strip-form test specimen thus coated with the silver paste was subjected to measurement of the volume resistivity under a condition of applied voltage of 10 V by means of an insulation resistance tester (high resistance meter "4329A", manufactured by Yokogawa Hewlett-Packard).

(3) Tensile elongation at break (unit: %): Measured in accordance with JIS K7113 using No. 1 test piece under a condition of a tensile speed of 10 mm/min.

(4) Specific gravity: Measured in accordance with JIS K7112 by an underwater substitution method.

(5) Flexural modulus (unit: MPa): Measured in accordance with JIS K7171 at 23° C.

(6) IZOD impact strength (unit: J/m): Measured in accordance with JIS K7110 at 23° C. and −30° C.

(7) Heat distortion temperature under load (unit: ° C.): Measured in accordance with JIS K7191-2 under a condition of 0.45 MPa.

Further, as the propylene resin and the carbon black, the following materials were employed.

Propylene Resin

Propylene resins produced in Preparation Examples 1 to 4, and "MG03B", "MA04" and "MA8", manufactured by Japan Polypropylene Corporation, were used. The physical properties of the respective propylene resins are as shown in Table 1.

PREPARATION EXAMPLE 1

PP-1

(i) Preparation of Ziegler Catalyst

Into a reactor having an internal capacity of 10 L and thoroughly flushed with nitrogen, 4,000 ml of n-heptane dehydrated and deoxidized, was introduced, and then, 8 mol of $MgCl_2$ and 16 mol of $Ti(O-n-C_4H_9)_4$ were introduced, followed by a reaction at 95° C. for 2 hours. After completion of the reaction, the temperature was lowered to 40° C., and 960 ml of methylhydropolysiloxane (one with 20 centistokes) was introduced and reacted for 3 hours. The formed solid component washed with n-heptane. Then, into a reactor having an internal capacity of 10 L and thoroughly flushed with nitrogen, 1,000 ml of n-heptane purified in the same manner as above, was introduced, and then the solid component prepared as described above was introduced in an amount of 4.8 mol as calculated as Mg atom. Then, 8 ml of $SiCl_4$ was mixed to 500 ml of n-heptane, and the mixture was introduced into a flask over 30 minutes at 30° C., followed by a reaction at 70° C. for 3 hours. After completion of the reaction, the product washed with n-heptane. Then, 0.48 mol of phthalic acid chloride was mixed to 500 ml of n-heptane, and the mixture was introduced into a flask over a period of 30 minutes at 70° C., followed by a reaction at 90° C. for 1 hour. After completion of the reaction, the product washed with n-heptane. Then, 200 ml of $SiCl_4$ was introduced, followed by a reaction at 80° C. for 6 hours. After completion of the reaction, the product was sufficiently washed with n-heptane to obtain a solid component. The titanium content of this component was 1.3 wt %.

Then, into a flask sufficiently flushed with nitrogen, 1,000 ml of n-heptane purified in the same manner as mentioned above was introduced, then 100 g of the solid component prepared as mentioned above was introduced, and 24 ml of $(t-C_4H_9)Si(CH_3)(OCH_3)_2$ and 34 g of $Al(C_2H_5)_3$ were contacted at 30° C. for 2 hours. After completion of the contact, the product was sufficiently washed with n-heptane to obtain a solid catalyst component composed mainly of magnesium chloride. The titanium content in this component was 1.1 wt %.

(ii) Preparation of Propylene Resin

Using the solid catalyst component obtained as described above and triethylaluminum, and employing a fluidized bed gas phase reactor having a capacity of the reaction portion of 280 L as a first polymerization step, homopolymerization of propylene was continuously carried out under conditions of a polymerization temperature of 85° C. and a propylene partial pressure of 22 kg/cm². At that time, the solid catalyst component was supplied continuously at a rate of 1.8 g/hr, and triethylaluminum was continuously supplied at a rate of 5.5 g/hr. The powder withdrawn from the first polymerization step was sent to a fluidized bed system gas phase reactor having a capacity of a reaction portion of 280 L used as a second polymerization step, continuously at 25 kg/hr, whereby copolymerization of propylene and ethylene was continuously carried out. From the second polymerization step, 27 kg/hr of a polymer was continuously withdrawn. The hydrogen concentration in each polymerization step was controlled so that in the first tank, $H_2$/propylene=0.045 mol ratio, and in the second tank, $H_2$/(ethylene+propylene)=0.01 mol ratio, thereby to control the molecular weight. With respect to the ethylene composition of a rubber-like ethylene/propylene copolymer portion, the gas composition of propylene and ethylene in the second polymerization step was controlled to be propylene/ethylene=1/1 mol ratio, to obtain an ethylene/propylene block copolymer. The isotactic pentad fraction of a propylene homopolymer withdrawn from the first polymerization tank was 0.986, and MFR was 142 g/10 min, and MFR of the ethylene/propylene block copolymer withdrawn from the second polymerization tank was 65 g/10 min, and the ethylene content of the copolymer portion was 52 wt %, and the content of the copolymer component was 8 wt %.

PREPARATION EXAMPLE 2

PP-2

An ethylene/propylene block copolymer was obtained in the same manner as in Preparation Example 1 except that the amount of hydrogen in the first polymerization step was changed to 0.048 by a molar ratio of $H_2$/propylene, and the amount of hydrogen in the second polymerization step was changed to 0.015 by a molar ratio of $H_2$/propylene.

PREPARATION EXAMPLE 3

PP-3

Using the solid catalyst component obtained in Preparation Example 1 and triethylaluminum and employing a fluidized bed gas phase reactor having a capacity of a reaction portion of 280 L as the first polymerization step, homopolymerization of propylene was continuously carried out under a condition of a polymerization temperature of 85° C. and a propylene partial pressure of 22 kg/cm². At that time, the solid catalyst component was supplied continuously at a rate of 1.4 g/hr and triethylaluminum was continuously supplied at a rate of 6.5 g/hr. The powder withdrawn from the first polymerization step was continuously sent at a rate of 19.5 kg/hr to a fluidized bed gas phase reactor having a capacity of a reaction portion of 280 L used as the second polymerization step, whereby copolymerization of propylene and ethylene was continuously carried out. From the second polymerization step, a polymer was withdrawn continuously at a rate of 26 kg/hr. The hydrogen concentration in each polymerization step was controlled so that in the first tank, $H_2$/propylene=0.0445 mol ratio, and in the second tank, $H_2$/(ethylene+propylene)=0.01 mol ratio, thereby to control the molecular weight. With respect to the ethylene composition of a rubber-like ethylene/propylene copolymer portion, the gas composition of propylene and ethylene in the second polymerization step was controlled so that propylene/ethylene=1/1 mol ratio, to obtain an ethylene/propylene block copolymer. The isotactic pentad fraction of the propylene homopolymer withdrawn from the first polymerization tank was 0.986, and MFR was 115 g/10 min. MFR of the ethylene/propylene block copolymer withdrawn from the second polymerization tank was 35 g/10 min, the ethylene content in the copolymer portion was 37 wt %, and the content of the copolymer component was 27 wt %.

PREPARATION EXAMPLE 4

PP-4

Using the solid catalyst component obtained in Preparation Example 1 and triethylaluminum and employing a fluidized bed gas phase reactor having a capacity of a reaction portion of 280 L as the first polymerization step, homopolymerization of propylene was continuously carried out under a condition of a polymerization temperature of 85° C. and a propylene partial pressure of 22 kg/cm². At that time, the solid catalyst component was continuously supplied at a rate of 1.4 g/hr, and triethylaluminum was continuously supplied at a rate of 8.5 g/hr. The powder withdrawn from the first polymerization step was continuously sent at a rate of 19.5 kg/hr to a fluidized bed gas phase reactor having a capacity of a reaction portion of 280 L used as the second polymerization step, and copolymerization of propylene and ethylene was continuously carried out. From the second polymerization step, polymer was continuously withdrawn at a rate of 22 kg/hr. The hydrogen concentration in each polymerization step was controlled so that in the first tank, $H_2$/propylene=0.045 mol ratio, and in the second tank, $H_2$/(ethylene+propylene)=0.01 mol ratio, thereby to control the molecular weight. The ethylene composition of a rubber-like propylene/ethylene copolymer portion was controlled by adjusting the gas composition of propylene and ethylene in the second polymerization step to be propylene/ethylene=1/1.2 mol ratio, to obtain a polypropylene block copolymer (PP-4). The isotactic pentad fraction of the propylene homopolymer withdrawn from the first polymerization tank was 0.987, and MFR was 20 g/10 min. MFR of the polypropylene block copolymer withdrawn from the second polymerization tank was 5.5 g/10 min, the ethylene content in the copolymer portion was 60 wt %, and the content of the copolymer component was 17 wt %.

Carbon Black

Carbon blacks prepared in the following Preparation Examples 5 and 6 and as commercially available carbon blacks, Ketjenblack EC, DENKA BLACK and TOKA-BLACK #5500 were used. The physical properties of the respective carbon blacks are as shown in Table 2.

PREPARATION EXAMPLES 5 AND 6

Using the apparatus for preparation of carbon black shown in FIG. 1, carbon black was prepared under the production conditions and in-furnace conditions such as the distance D for introducing raw material oil and distance E for termination of the reaction, as shown in Table 3. Further, the in-furnace dimensions D1 to D3 and L1 in FIG. 1 are such that D1=1,100 mm in diameter, D2=175 mm in diameter, D3=400 mm in diameter, L1=3,300 mm and D2'=190 mm in diameter.

Further, heavy oil was employed as the fuel for a high temperature combustion gas stream. Further, the carbon black raw material (feedstock oil) was creosote oil, and the temperature in the furnace at the second reaction zone was 1,750° C.

Ethylene Elastomer

Commercial ethylene elastomers shown in Table 4: ENGAGE 8200 and ENGAGE 8407 (manufactured by DuPont Dow Elastomers) were employed.

Other Component

As other component, compressed talc having an average particle size of 7.8 μm (MICRON WHITE 5000SMA, manufactured by Hayashi-Kasei Co., Ltd.) (hereinafter referred to as talc) was employed.

EXAMPLES 1 to 17 AND COMPARATIVE EXAMPLES 1 TO 11

A propylene resin, carbon black, an ethylene elastomer and talc were blended in accordance with the blend composition shown in Table 5 or 7, and to 100 parts by weight of the blend, 0.1 part by weight of a phenolic antioxidant (IRGANOX 1010, manufactured by Ciba Specialty Chemicals), 0.05 part by weight of a phosphorus type antioxidant (IRGAFOS 168, manufactured by Ciba Specialty Chemicals) and 0.3 part by weight of calcium stearate were added and mixed, followed by melt-kneading by means of a co-rotating twin screw extruder (TEX30α, manufactured by The Japan Steel Works, LTD.) at a screw rotational speed of 300 rpm at an extrusion rate of 15 kg/hr to obtain a pelletized propylene resin composition.

Using the obtained pellets, injection molding was carried out under conditions of a mold temperature of 40° C. and a cylinder temperature of 220° C. to obtain various test specimens of the propylene resin composition. Using the obtained test specimens, various physical properties were evaluated by the above-described methods, and the evaluation results are shown in Table 6.

From Tables 6 and 8, in Comparative Examples 1 to 11 wherein propylene resin compositions outside the scope of the present invention were employed, poor balance of the electroconductivity or the tensile elongation due to the electroconductive performance and dispersibility of carbon black, was confirmed. Whereas, with the propylene resin composition of the present invention, the electroconductivity and tensile elongation are simultaneously good.

EXAMPLES 18 TO 20

A propylene, carbon black, an ethylene elastomer and other components were blended in accordance with the blend composition shown in Table 9, and 0.1 part by weight of a phenolic antioxidant (IRGANOX 1010, manufactured by Ciba Specialty Chemicals), 0.05 part by weight of a phosphorus type antioxidant (IRGAFOS 168, manufactured by Ciba Specialty Chemicals) and 0.3 part by weight of calcium stearate were mixed thereto, followed by melt-kneading by means of a co-rotating twin screw extruder (TEX30α, manufactured by The Japan Steel Works, LTD.) at a screw rotational speed of 300 rpm at an extrusion rate of 15 kg/hr to obtain a pelletized polypropylene resin composition. Using the obtained pellets, sheets having a thickness of 0.5 mm were formed under conditions of an extrusion temperature and a die temperature of 220° C., a die width of 600 mm and a lip opening of 0.8 mm, to obtain various test specimens of the propylene resin composition. Using the obtained test specimens, the various physical properties and the container-moldability were evaluated by the above-described methods. The evaluation results are shown in Table 9.

COMPARATIVE EXAMPLES 12 TO 16

Various blend components were blended in accordance with the blend composition shown in Table 9, and a test was carried out in the same method as in Examples to obtain the results shown in Table 9. It was confirmed that the electroconductivity and the container moldability were poor due to the electroconductive performance and dispersibility of carbon black.

The specific gravity, MFR, flexural modulus, volume resistivity and container-moldability shown in Table 9 were measured as follows.

(1) Specific gravity: The same as in Examples 1 to 17
(2) MFR: The same as in Examples 1 to 17.
(3) Flexural modulus: JIS K6758.
(4) Volume resistivity: Using a sheet having a thickness of 0.5 mm, the measurement was carried out in the same manner as in Examples 1 to 17.
(5) Container-moldability: Using an indirect heating-system pressure forming machine (cosmic forming machine manufactured by Asano Laboratories), a container was formed to have a form wherein a total of 16 pockets i.e. 4×4 pockets each having a length of 5 cm, a width of 5 cm and a depth of 5 cm, were arranged with a distance of 3 cm from one another. The forming conditions were such that the sheet was heated while the upper and the lower heaters located at 20 cm from the sheet were maintained at 450° C., and the heating time was changed between from 20 to 40 seconds, whereby many sheets different in the heated state were used as base materials, and many containers corresponding thereto were produced.

With respect to each container prepared as described above, the shape and appearance of the container were visually observed, and evaluation was carried out on the basis of the following standards.

◎: Shaping is complete over details of the molded product, which is free from elongation defect or the like.

○: A certain elongation defect (partially thin wall thickness) is observed in the molded product, but shaping is complete over details.

X: Due to poor elongation of the molded product, a hole is formed, or shrinkage or the like remains, and shaping is not complete over details.

INDUSTRIAL APPLICABILITY

The propylene resin composition of the present invention is excellent in the balance of electrical conductivity, flowability, specific gravity and tensile elongation and has a high level of moldability, light weight and tensile elongation while maintaining a sufficient electroconductivity, whereby it becomes possible to further expand the application range of the polypropylene resin, of which the amount of use has been increased in recent years. Further, in an application to e.g. large size components for which electroconductivity has been imparted by coating of a conductive material formed into a paste by using an organic solvent or the like, there will be no necessity for such coating, whereby not only the process can be simplified, but also a hazardous organic solvent will be unnecessary. Thus, it can be regarded as a technique to realize saving of energy resources or reduction of a hazardous material and thus lead to protection of the global environment, and its industrial value is extremely high.

The entire disclosure of Japanese Patent Application No. 2004-73100 (filed on Mar. 15, 2004) including specification, claims, drawings and summary is incorporated herein by reference in its entirety.

TABLE 1

| | | Propylene resin | | | | | | |
|---|---|---|---|---|---|---|---|---|
| | | Homopolymer portion | | | Copolymer portion | | | Polypropylene |
| | | | | | Ethylene | | | |
| Names | Classification Type | MFR g/10 min | IPF | Content wt % | MFR g/10 min | content wt % | Content wt % | MFR g/10 min |
| PP-1 | Block | 142 | 0.986 | 92 | 0.008 | 52 | 8 | 65 |
| PP-2 | Block | 213 | 0.987 | 92 | 0.017 | 37 | 8 | 100 |
| PP-3 | Block | 115 | 0.986 | 73 | 0.6 | 37 | 27 | 35 |
| PP-4 | Block | 20 | 0.987 | 83 | 0.006 | 60 | 17 | 5.5 |
| MA04 | Homopolymer | 40 | 0.986 | 100 | — | — | 0 | 40 |
| MG03B | Random | 30 | 0.983 | 100 | — | — | 0 | 30 |
| MA8 | Homopolymer | 1 | 0.986 | 100 | — | — | 0 | 1 |

TABLE 2

| | | Carbon black | | | | |
|---|---|---|---|---|---|---|
| | | Names | | | | |
| | | CB-1 | CB-2 | Ketjen EC | DENKA BLACK granules | TOKABLACK #5500 |
| | | | | Manufacturers | | |
| | | Prep. Example 5 | Prep. Example 6 | Ketjen black International | DENKI KAGAKU | TOKAI CARBON |
| Average particle size | nm | 15 | 18 | 30 | 36 | 28 |
| Nitrogen adsorption specific surface area | $m^2/g$ | 288 | 204 | 800 | 72 | 253 |
| DBP absorption | $cm^3/100\,g$ | 159 | 167 | 360 | 164 | 160 |
| 24M4DBP absorption | $cm^3/100\,g$ | 135 | 131 | 320 | 125 | 127 |
| CTAB adsorption specific surface area | $m^2/g$ | 195 | 153 | — | 70 | 148 |
| Dehydrogenation amount | mg/g | 0.77 | 0.93 | 2.95 | 0.32 | 1.5 |
| Crystallite size Lc | Å | 14.0 | 14.0 | — | 35 | 14.9 |
| Stokes mode diameter (Dmod) | nm | 84 | 93 | 103 | 146 | 119 |
| Stokes mold half value width (D1/2) | nm | 69 | 69 | 114 | 192 | 86 |
| Dmod/24M4DBP | — | 0.62 | 0.69 | 0.32 | 1.17 | 0.94 |
| D1/2/24M4DBP | — | 0.51 | 0.51 | 0.36 | 1.54 | 0.68 |
| CO emission | mg/g | 13.9 | 15.7 | 11.9 | 6.9 | 11.7 |
| $CO_2$ emission | mg/g | 4.28 | 2.49 | 0.78 | 0 | 3.84 |
| Oxygen-containing functional group density | $\mu mol/m^2$ | 2.06 | 2.58 | 0.55 | 3.44 | 1.99 |

TABLE 3

Conditions for preparing carbon black

|  | Unit | Preparation Example 4 | Preparation Example 5 |
|---|---|---|---|
| Amount of air for combustion | $Nm^3/h$ | 5800 | 5800 |
| Temperature of air for combustion | °C. | 640 | 640 |
| Type of fuel | — | Heavy oil C | Heavy oil C |
| Amount of fuel | kg/h | 314 | 314 |
| Amount of raw material oil | kg/h | 1040 | 1220 |
| Distance for introducing the raw material oil | mm | 1650 | 1650 |
| Distance for terminating reaction | mm | 4430 | 4430 |
| Amount of water to terminate reaction | kg/h | 3000 | 3000 |
| Retention time from introduction of raw material to termination of reaction | mmsec | 57 | 57 |

TABLE 4

Ethylene elastomer

| Name Abbreviated name/ product name | Classification Copolymer species | MFR 230° C. g/10 min | Density g/cc | Comonomer content wt % |
|---|---|---|---|---|
| EG8200 ENGAGE 8200 | Ethylene/octene copolymer | 11.9 | 0.872 | 38.5 |
| EG8407 ENGAGE 8407 | Ethylene/octene copolymer | 59 | 0.872 | 38.5 |

TABLE 5

Blend compositions in Examples

| | Polypropylene | | Carbon black | | Ethylene elastomer | | Talc |
|---|---|---|---|---|---|---|---|
| Names | Type | Blend ratio wt % | Type | Blend ratio wt % | Type | Blend ratio wt % | Blend ratio wt % |
| Example 1 | MA04 | 93 | CB-1 | 7 | — | 0 | 0 |
| Example 2 | MA04 | 88 | CB-1 | 12 | — | 0 | 0 |
| Example 3 | MG03B | 93 | CB-1 | 7 | — | 0 | 0 |
| Example 4 | MG03B | 90 | CB-1 | 10 | — | 0 | 0 |
| Example 5 | PP-1 | 93 | CB-1 | 7 | — | 0 | 0 |
| Example 6 | PP-1 | 90 | CB-1 | 10 | — | 0 | 0 |
| Example 7 | PP-1 | 84 | CB-1 | 16 | — | 0 | 0 |
| Example 8 | PP-2 | 93 | CB-1 | 7 | — | 0 | 0 |
| Example 9 | PP-2 | 86 | CB-1 | 14 | — | 0 | 0 |
| Example 10 | PP-3 | 93 | CB-1 | 7 | — | 0 | 0 |
| Example 11 | PP-3 | 90 | CB-1 | 10 | — | 0 | 0 |
| Example 12 | PP-2 | 68 | CB-1 | 7 | EG8200 | 25 | 0 |
| Example 13 | PP-2 | 65 | CB-1 | 10 | EG8200 | 25 | 0 |
| Example 14 | PP-2 | 68 | CB-1 | 7 | EG8407 | 25 | 0 |
| Example 15 | PP-2 | 48 | CB-1 | 7 | EG8200 | 25 | 20 |
| Example 16 | PP-2 | 45 | CB-1 | 10 | EG8200 | 25 | 20 |
| Example 17 | PP-1 | 93 | CB-2 | 7 | — | 0 | 0 |

TABLE 6

Evaluation results in Examples

| Names | MFR 230° C. g/10 min | Specific gravity | Volume resistivity Ω cm | Tensile elongation at break 10 mm/min % | Flexural modulus MPa | Izod impact strength 23° C. J/m | Izod impact strength −30° C. J/m | Heat distortion temperature under load 0.45 MPa ° C. |
|---|---|---|---|---|---|---|---|---|
| Example 1 | 29 | 0.932 | $4 \times 10^8$ | 250 | 1900 | 21 | 5 | 122 |
| Example 2 | 14 | 0.957 | $2 \times 10^3$ | 230 | 1930 | 20 | 5 | 120 |
| Example 3 | 20 | 0.932 | $1 \times 10^8$ | 290 | 1240 | 30 | 10 | 90 |
| Example 4 | 10 | 0.947 | $9 \times 10^3$ | 260 | 1260 | 29 | 9 | 89 |
| Example 5 | 35 | 0.932 | $3 \times 10^8$ | 235 | 1530 | 42 | 19 | 122 |
| Example 6 | 26 | 0.947 | $3 \times 10^4$ | 210 | 1500 | 45 | 21 | 120 |
| Example 7 | 14 | 0.977 | $2 \times 10^2$ | 180 | 1410 | 60 | 29 | 116 |
| Example 8 | 43 | 0.932 | $2 \times 10^8$ | 200 | 1600 | 40 | 15 | 122 |
| Example 9 | 31 | 0.967 | $2 \times 10^2$ | 150 | 1490 | 45 | 20 | 120 |
| Example 10 | 20 | 0.932 | $5 \times 10^8$ | 265 | 850 | 460 | 51 | 89 |
| Example 11 | 10 | 0.947 | $4 \times 10^4$ | 220 | 800 | 510 | 59 | 87 |
| Example 12 | 25 | 0.925 | $6 \times 10^7$ | >300 | 1100 | 580 | 67 | 89 |
| Example 13 | 18 | 0.939 | $4 \times 10^3$ | >300 | 1010 | 590 | 69 | 86 |
| Example 14 | 40 | 0.925 | $2 \times 10^5$ | 230 | 1050 | 540 | 62 | 89 |
| Example 15 | 23 | 1.071 | $3 \times 10^7$ | >300 | 1640 | 530 | 62 | 115 |
| Example 16 | 18 | 1.091 | $3 \times 10^3$ | >300 | 1590 | 560 | 65 | 108 |
| Example 17 | 33 | 0.932 | $4 \times 10^8$ | 245 | 1540 | 42 | 20 | 122 |

TABLE 7

Blend compositions in Comparative Examples

| | Polypropylene | | Carbon black | | Ethylene elastomer | | Talc |
|---|---|---|---|---|---|---|---|
| | Type | Blend ratio wt % | Type | Blend ratio wt % | Type | Blend ratio wt % | Blend ratio wt % |
| Comparative Example 1 | MA8 | 93 | CB-1 | 7 | — | 0 | 0 |
| Comparative Example 2 | PP-1 | 99 | CB-1 | 1 | — | 0 | 0 |
| Comparative Example 3 | PP-2 | 97 | Ketjen EC | 3 | — | 0 | 0 |
| Comparative Example 4 | PP-2 | 95 | Ketjen EC | 5 | — | 0 | 0 |
| Comparative Example 5 | PP-2 | 40 | CB-1 | 60 | — | 0 | 0 |
| Comparative Example 6 | PP-2 | 95 | TOKABLACK #5500 | 5 | — | 0 | 0 |
| Comparative Example 7 | PP-2 | 90 | TOKABLACK #5500 | 10 | — | 0 | 0 |
| Comparative Example 8 | PP-2 | 85 | TOKABLACK #5500 | 15 | — | 0 | 0 |
| Comparative Example 9 | PP-2 | 95 | DENKA BLACK granules | 5 | — | 0 | 0 |
| Comparative Example 10 | PP-2 | 90 | DENKA BLACK granules | 10 | — | 0 | 0 |
| Comparative Example 11 | PP-2 | 85 | DENKA BLACK granules | 15 | — | 0 | 0 |

TABLE 8

Evaluation results in Comparative Examples

| | MFR 230° C. g/10 min | Specific gravity | Volume resistivity Ω cm | Tensile elongation at break 10 mm/min % | Flexural modulus MPa | Izod impact strength 23° C. J/m | Izod impact strength −30° C. J/m | Heat distortion temperature under load 0.45 MPa ° C. |
|---|---|---|---|---|---|---|---|---|
| Comparative Example 1 | Not flowable | 0.932 | $9 \times 10^8$ | 300 | 1680 | 45 | 10 | 118 |
| Comparative Example 2 | 63 | 0.905 | Non-conductive | 280 | 1610 | 30 | 15 | 121 |
| Comparative Example 3 | 80 | 0.914 | $9 \times 10^9$ | 85 | 1590 | 40 | 19 | 120 |
| Comparative Example 4 | 48 | 0.924 | $9 \times 10^6$ | 50 | 1550 | 45 | 21 | 119 |
| Comparative Example 5 | Not flowable | 1.28 | At most $1 \times 10^2$ | 10 | 1430 | 46 | 20 | 116 |
| Comparative Example 6 | 45 | 0.925 | $3 \times 10^{11}$ | 280 | 1560 | 45 | 20 | 120 |
| Comparative Example 7 | 20 | 0.951 | $2 \times 10^9$ | 230 | 1530 | 46 | 20 | 120 |
| Comparative Example 8 | 8 | 0.974 | $5 \times 10^5$ | 200 | 1460 | 49 | 21 | 118 |
| Comparative Example 9 | 51 | 0.924 | $6 \times 10^9$ | 280 | 1550 | 46 | 20 | 120 |
| Comparative Example 10 | 24 | 0.952 | $4 \times 10^9$ | 265 | 1520 | 46 | 20 | 119 |
| Comparative Example 11 | 13 | 0.976 | $6 \times 10^4$ | 65 | 1450 | 50 | 21 | 118 |

TABLE 9

Blend compositions in Examples

| | Polypropylene | | Carbon black | | Ethylene elastomer | | Talc |
|---|---|---|---|---|---|---|---|
| | Type | Blend ratio wt % | Type | Blend ratio wt % | Type | Blend ratio wt % | Blend ratio wt % |
| Example 18 | PP-4 | 90 | CB-1 | 10 | — | 0 | 0 |
| Example 19 | PP-4 | 80 | CB-1 | 20 | — | 0 | 0 |
| Example 20 | PP-4 | 55 | CB-1 | 20 | EG8200 | 5 | 20 |
| Comparative Example 12 | PP-4 | 99 | CB-1 | 1 | — | 0 | 0 |
| Comparative Example 13 | PP-4 | 90 | Ketjen EC | 10 | — | 0 | 0 |
| Comparative Example 14 | PP-4 | 90 | TOKABLACK #5500 | 10 | — | 0 | 0 |
| Comparative Example 15 | PP-4 | 90 | DENKA BLACK granules | 10 | — | 0 | 0 |
| Comparative Example 16 | MA8 | 90 | CB-1 | 10 | — | 0 | 0 |

| | MFR 230° C. g/10 min | Specific gravity | Volume resistivity Ω cm | Flexural modulus MPa | Evaluation |
|---|---|---|---|---|---|
| Example 18 | 0.5 | 0.947 | $6 \times 10^7$ | 1380 | ⊚ |
| Example 19 | 0.2 | 0.98 | $3 \times 10^3$ | 1520 | ○ |
| Example 20 | 0.1 | 1.102 | $2 \times 10^2$ | 1680 | ⊚ |
| Comparative Example 12 | Not flowable | 0.904 | Non-conductive | 1680 | X |
| Comparative Example 13 | 0.2 | 0.943 | $4 \times 10^7$ | 1280 | X |
| Comparative Example 14 | 0.4 | 9,949 | $5 \times 10^{11}$ | 1320 | ○ |
| Comparative Example 15 | 0.3 | 9,951 | $3 \times 10^9$ | 1400 | ○ |
| Comparative Example 16 | Not flowable | 0.952 | $1 \times 10^9$ | 1890 | X |

The invention claimed is:

1. A propylene resin composition comprising from 50 to 98 wt % of a propylene resin having a MFR of from 5 to 300 g/10 min, and from 2 to 50 wt % of carbon black having a 24M4DBP absorption of at least 130 cm³/100 g, a dehydrogenation amount of at most 1.2 mg/g at 1,500° C. for 30 minutes and a crystallite size (Lc) of from 10 to 17 Å.

2. The propylene resin composition according to claim 1, wherein the propylene resin is a propylene copolymer containing from 0.1 to 50 wt % of an olefin comonomer other than propylene.

3. The propylene resin composition according to claim 1, wherein the propylene resin is a propylene block copolymer which contains propylene homopolymer blocks and copolymer blocks formed by copolymerization of ethylene with other α-olefin and which has a MFR of from 5 to 300 g/10 min, wherein the above propylene homopolymer blocks have a MFR of from 20 to 300 g/10 min, and the above copolymer blocks have an ethylene content of from 15 to 60 wt % and a MFR of from 0.001 to 6 g/10 min.

4. The propylene resin composition according to claim 1, wherein the carbon black has an nitrogen absorption specific surface area of from 150 to 300 m²/g.

5. The propylene resin composition according to claim 1, wherein the ratio ($D/_{mod}$/24M4DBP) of the stokes mode diameter ($D_{mod}$) to the 24M4DBP absorption of carbon black is from 0.6 to 0.9.

6. An injection molded product which is a propylene resin molded product obtained by molding the propylene resin composition as defined in claim 1 and which has a volume resistivity of from $10^2$ to $10^9$ Ω·cm and a MFR of from 1 to 80 g/10 min.

7. An extrusion molded product which is a molded product obtained by molding the polypropylene resin composition as defined in claim 1 and which has a volume resistivity of from $10^2$ to $10^9$ (Ω cm) and a MFR of from 0.01 to 20 (g/10 min).

8. A molded product which is a molded product of the propylene resin composition as defined in claim 1 and which is formed by a molding method selected from the group consisting of injection molding, compression molding, injection compression molding and extrusion molding.

9. A propylene resin composition comprising from 10 to 80 wt % of a propylene resin having a MFR of from 5 to 300 g/10 min, from 2 to 50 wt % of carbon black having a 24M4DBP absorption of at least 130 cm³/100 g, a dehydrogenation amount of at most 1.2 mg/g at 1,500° C. for 30 minutes and a crystallite size (Lc) of from 10 to 17 Å, and from 10 to 50 wt % of an ethylene elastomer, wherein the ethylene elastomer is a copolymer of ethylene with at least one other α-olefin, and has an ethylene content in the copolymer of at least 50 wt %, a MFR of at least 1.0 g/10 min and a density of at most 0.890 g/cc.

10. The propylene resin composition according to claim 9, wherein the propylene resin is a propylene copolymer containing from 0.1 to 50 wt % of an olefin comonomer other than propylene.

11. The propylene resin composition according to claim 9, wherein the propylene resin is a propylene block copolymer which contains propylene homopolymer blocks and copolymer blocks formed by copolymerization of ethylene with other α-olefin and which has a MFR of from 5 to 300 g/10 min, wherein the above propylene homopolymer blocks have a MFR of from 20 to 300 g/10 min, and the above copolymer blocks have an ethylene content of from 15 to 60 wt % and a MFR of from 0.001 to 6 g/10 min.

12. The propylene resin composition according to claim 9 wherein the carbon black has an nitrogen absorption specific surface area of from 150 to 300 $m^2/g$.

13. The propylene resin composition according to claim 9, wherein the ratio ($D_{mod}$/24M4DBP) of the stokes mode diameter ($D_{mod}$) to the 24M4DBP absorption of carbon black is from 0.6 to 0.9.

14. An injection molded product which is a propylene resin molded product obtained by molding the propylene resin composition as defined in claim 9 and which has a volume resistivity of from $10^2$ to $10^9$ Ω·cm and a MFR of from 1 to 80 g/10 min.

15. An extrusion molded product which is a molded product obtained by molding the polypropylene resin composition as defined in claim 9 and which has a volume resistivity of from 10 to $10^9$ (Ω cm) and a MFR of from 0.01 to 20 (g/10 min).

16. A molded product which is a molded product of the propylene resin composition as defined in claim 9 and which is formed by a molding method selected from the group consisting of injection molding, compression molding, injection compression molding and extrusion molding.

* * * * *